(12) United States Patent
Igarashi et al.

(10) Patent No.: US 10,765,937 B2
(45) Date of Patent: Sep. 8, 2020

(54) OPERATING DEVICE

(71) Applicant: SONY INTERACTIVE ENTERTAINMENT INC., Tokyo (JP)

(72) Inventors: Takeshi Igarashi, Tokyo (JP); Masaho Morita, Tokyo (JP); Kazuyoshi Enomoto, Tokyo (JP); Toshimasa Aoki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/714,816

(22) Filed: Dec. 16, 2019

(65) Prior Publication Data

US 2020/0114256 A1    Apr. 16, 2020

Related U.S. Application Data

(63) Continuation of application No. 15/663,829, filed on Jul. 31, 2017, now Pat. No. 10,507,386, which is a
(Continued)

(30) Foreign Application Priority Data

Oct. 15, 2012  (JP) ................................. 2012-228481
Feb. 18, 2013  (JP) ................................. 2013-029458

(51) Int. Cl.
*A63F 13/24*    (2014.01)
*A63F 13/23*    (2014.01)
(Continued)

(52) U.S. Cl.
CPC .............. *A63F 13/24* (2014.09); *A63F 13/21* (2014.09); *A63F 13/213* (2014.09); *A63F 13/23* (2014.09); *G06F 3/017* (2013.01); *G06F 3/0338* (2013.01)

(58) Field of Classification Search
USPC ......................................................... 463/37
See application file for complete search history.

(56) References Cited

U.S. PATENT DOCUMENTS

| | | | |
|---|---|---|---|
| 6,186,896 B1* | 2/2001 | Takeda | A63F 13/02 463/38 |
| 7,314,413 B2* | 1/2008 | Ogata | A63F 13/06 463/37 |

(Continued)

FOREIGN PATENT DOCUMENTS

| | | |
|---|---|---|
| CN | 87107536 A | 6/1988 |
| CN | 1336841 A | 2/2002 |

(Continued)

OTHER PUBLICATIONS

Office Action dated Nov. 28, 2019 for corresponding CN Application No. 201710706784.3.

*Primary Examiner* — Pierre E Elisca
(74) *Attorney, Agent, or Firm* — HEA Law PLLC

(57) ABSTRACT

In order to reduce influences of light from indoor lighting equipment or the like on the accuracy in detecting the position of an operating device, an operating device (301) includes: left and right hold sections to be held by a user, each of which is provided with an operating member at an upper surface thereof; a central section (321) which is a section between the left and right hold sections; and a light emitting surface (328c) adapted to emit light to be captured by an information processing apparatus through a camera, the light emitting surface (328c) provided at a front surface of the central section (321). The central section (321) includes a portion which is located over the light emitting surface (328c) and is located on a more forward side than the light emitting surface (328c).

6 Claims, 28 Drawing Sheets

Related U.S. Application Data continuation of application No. 14/435,744, filed as application No. PCT/JP2013/069064 on Jul. 11, 2013, now Pat. No. 9,789,395.

(51) Int. Cl.
| | | |
|---|---|---|
| *A63F 13/21* | (2014.01) | |
| *G06F 3/0338* | (2013.01) | |
| *G06F 3/01* | (2006.01) | |
| *A63F 13/213* | (2014.01) | |

(56) References Cited

U.S. PATENT DOCUMENTS

| 9,327,192 B2* | 5/2016 | Nonaka | A63F 13/10 |
|---|---|---|---|
| 2011/0165931 A1* | 7/2011 | Brosnan | A63F 13/10 |
| | | | 463/16 |

FOREIGN PATENT DOCUMENTS

| CN | 1656411 A | 8/2005 |
|---|---|---|
| CN | 1937710 A | 3/2007 |
| CN | 101368686 A | 2/2009 |
| CN | 101479782 A | 7/2009 |
| CN | 101965534 A | 2/2011 |

* cited by examiner

OPERATING DEVICE

TECHNICAL FIELD

The present invention relates to an operating device to be utilized as an input device for an information processing apparatus such as a game machine.

BACKGROUND ART

Conventionally, there has been an operating device to be utilized as an input device for an information processing apparatus such as a game machine. An operating device disclosed in PTL 1 set forth below includes hold sections to be held by a user, at the left and the right thereof. The hold sections are provided with operating members such as operating buttons and direction keys.

CITATION LIST

Patent Literature

[PTL 1]
U.S. Pat. No. 6,394,906

SUMMARY

Technical Problem

If an information processing apparatus can detect the position of an operating device, an image displayed on a display or movements of an object in the image can be changed according to the position of the operating device, namely, the position of the user. As a result, the pleasure of using the information processing apparatus and the operating device can be increased. As a method for detecting the position of an operating device, a method has been investigated in which an operating device is provided with a light emitting section adapted to emit light upon receiving light from a light source such as an LED, and the light from the light emitting section is captured by an information processing apparatus through a camera.

However, if light from room lighting equipment or the like is reflected on a surface of the light emitting section and mixes into the light outgoing from the light emitting section, it would become difficult to accurately detect the position of the operating device.

In addition, in order to enhance the accuracy in detecting the position of the operating device by the information processing apparatus, it is desirable that emission of light from the light emitting section is even over the whole area of the light emitting section. Where the number of the light sources is small, however, it is difficult to cause the surface of the light emitting section to shine evenly.

Solution to Problem

According to the present invention, there is provided an operating device including: left and right hold sections to be held by a user, each of the left and right hold sections being provided with an operating member at an upper surface thereof; a central section which is a section between the left and right hold sections; and a light emitting surface adapted to emit light to be captured by an information processing apparatus through a camera, the light emitting surface being provided at a front surface of the central section. The central section includes a portion which is located over the light emitting surface and is located on a more forward side than the light emitting surface.

In accordance with this operating device, influences of light from room lighting equipment or the like on the accuracy in detecting the position of the operating device can be reduced.

According to the present invention, there is provided another operating device including: left and right hold sections to be held by a user, each of the left and right hold sections being provided with an operating member at an upper surface thereof; a central section which is a section between the left and right hold sections; a light emitting panel having at a front surface thereof a light emitting surface adapted to emit light to be captured by an information processing apparatus through a camera, the light emitting panel being provided at a front surface of the central section; a light source disposed inside the central section, the light source disposed in a position spaced apart rearward from the light emitting panel; and a light guide member extending from the light source toward a back surface of the light emitting panel. The light guide member has left and right side surfaces so inclined that the width of the light guide member in a left-right direction gradually increases along a forward direction. In accordance with this operating device, imbalance in the brightness on the surface of the light emitting panel can be suppressed.

DESCRIPTION OF EMBODIMENTS

First Example of Operating Device

Figure 1:
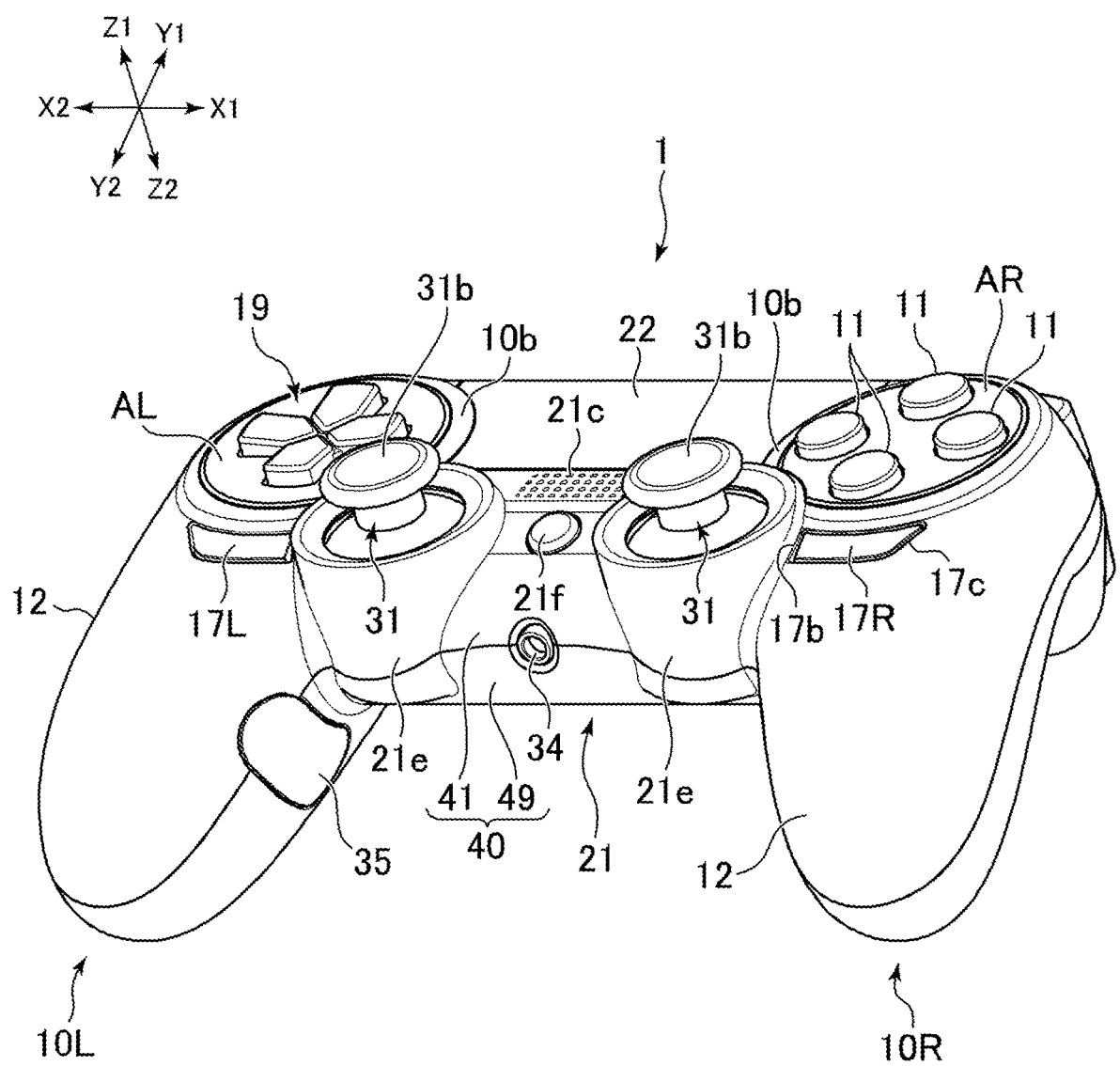
FIG. 1 is a perspective view showing an upper side of a first example of an operating device.
Figure 2:
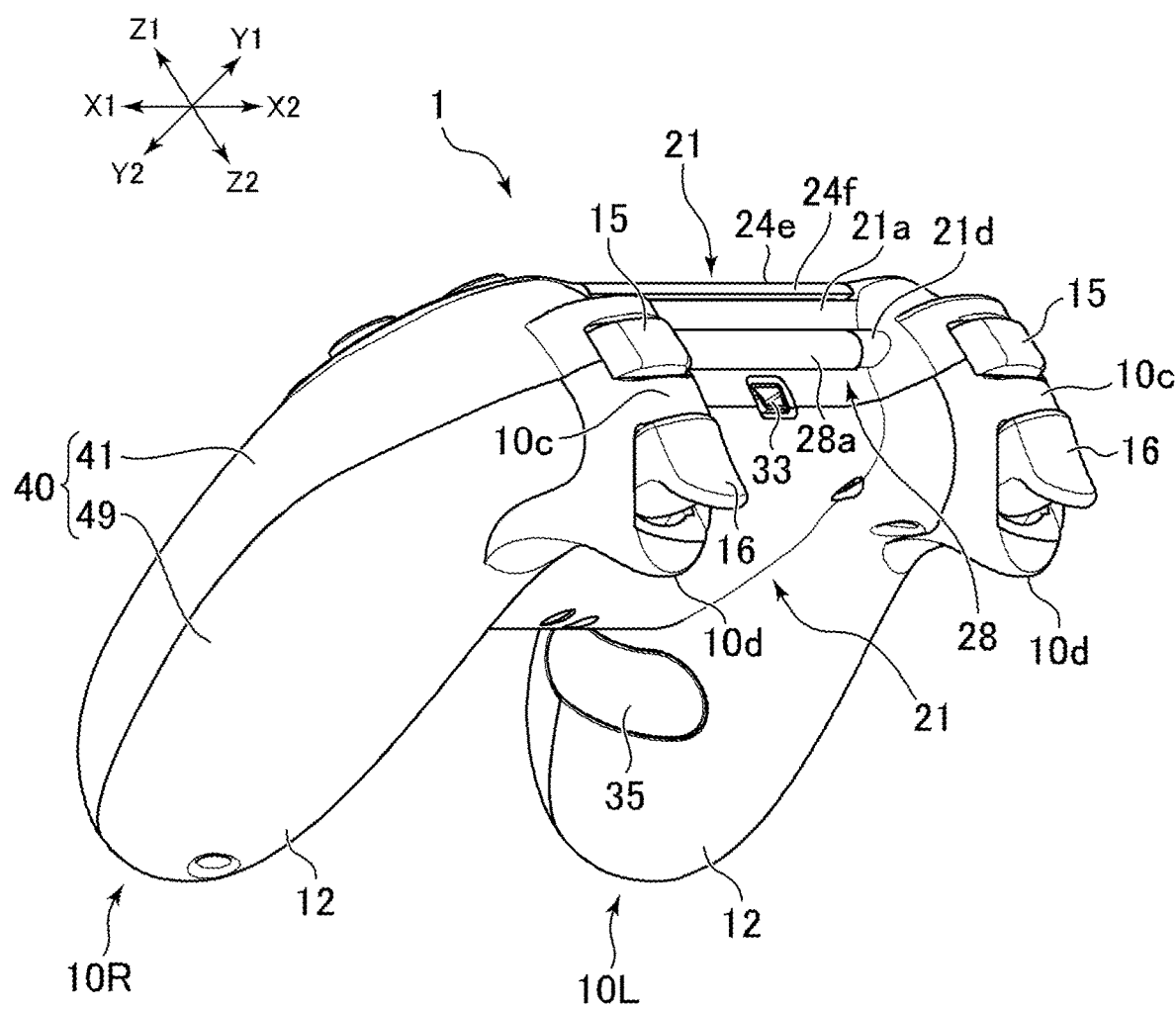
FIG. 2 is a perspective view showing a front side of the operating device shown in FIG. 1.
Figure 3:
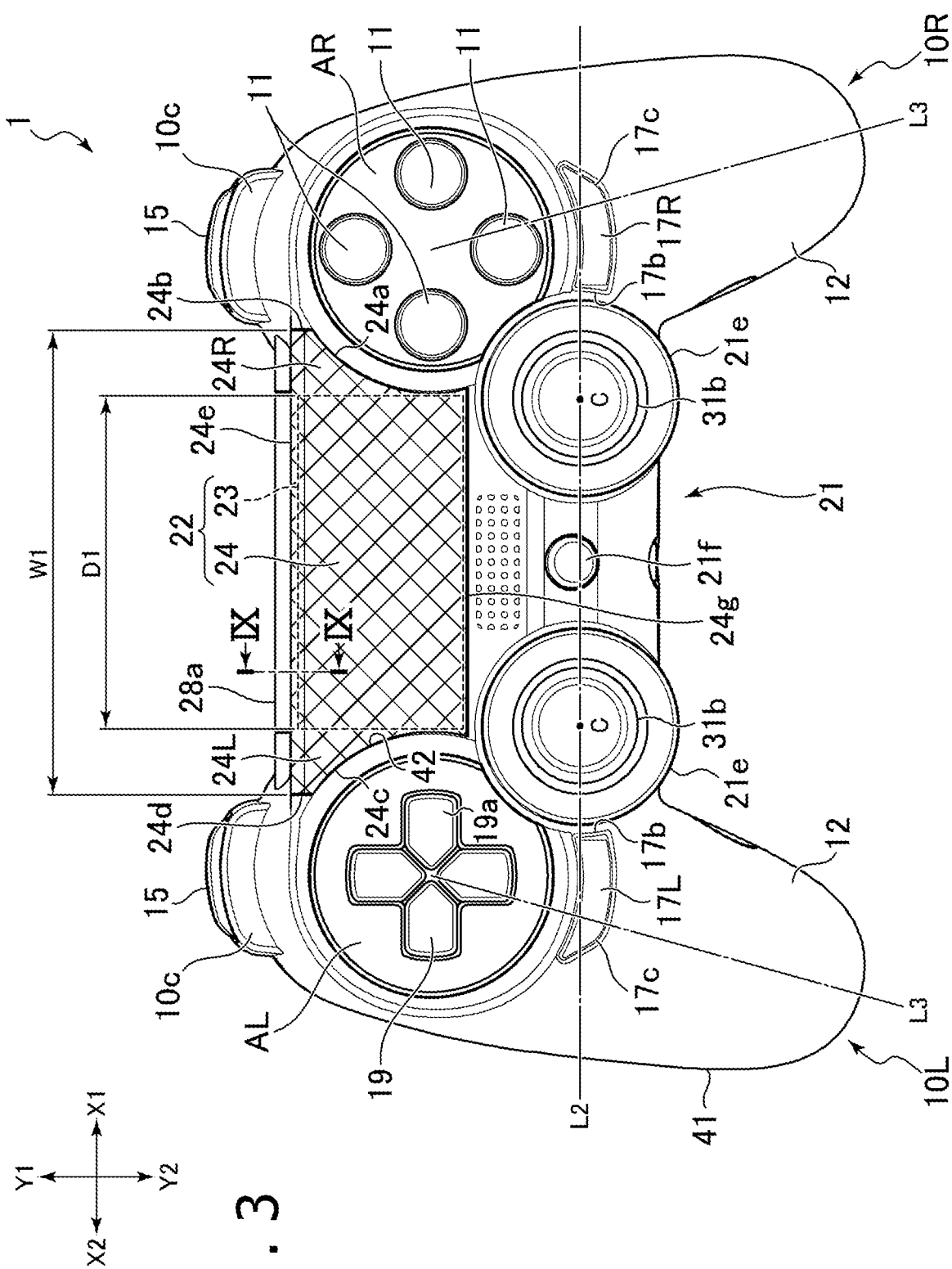
FIG. 3 is a plan view of the operating device shown in FIG. 1.
Figure 4:
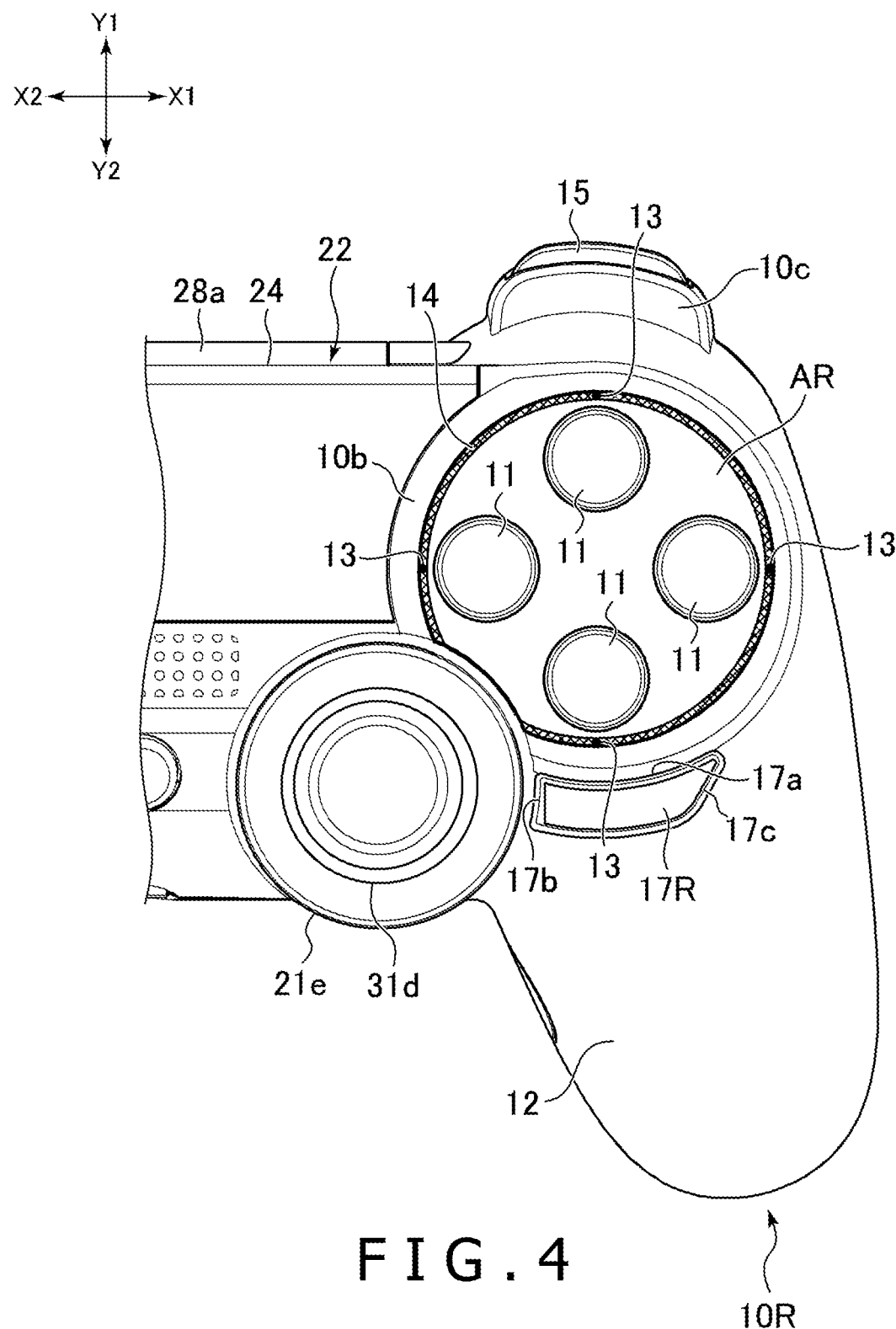
FIG. 4 is an enlarged view of FIG. 3.
Figure 5:
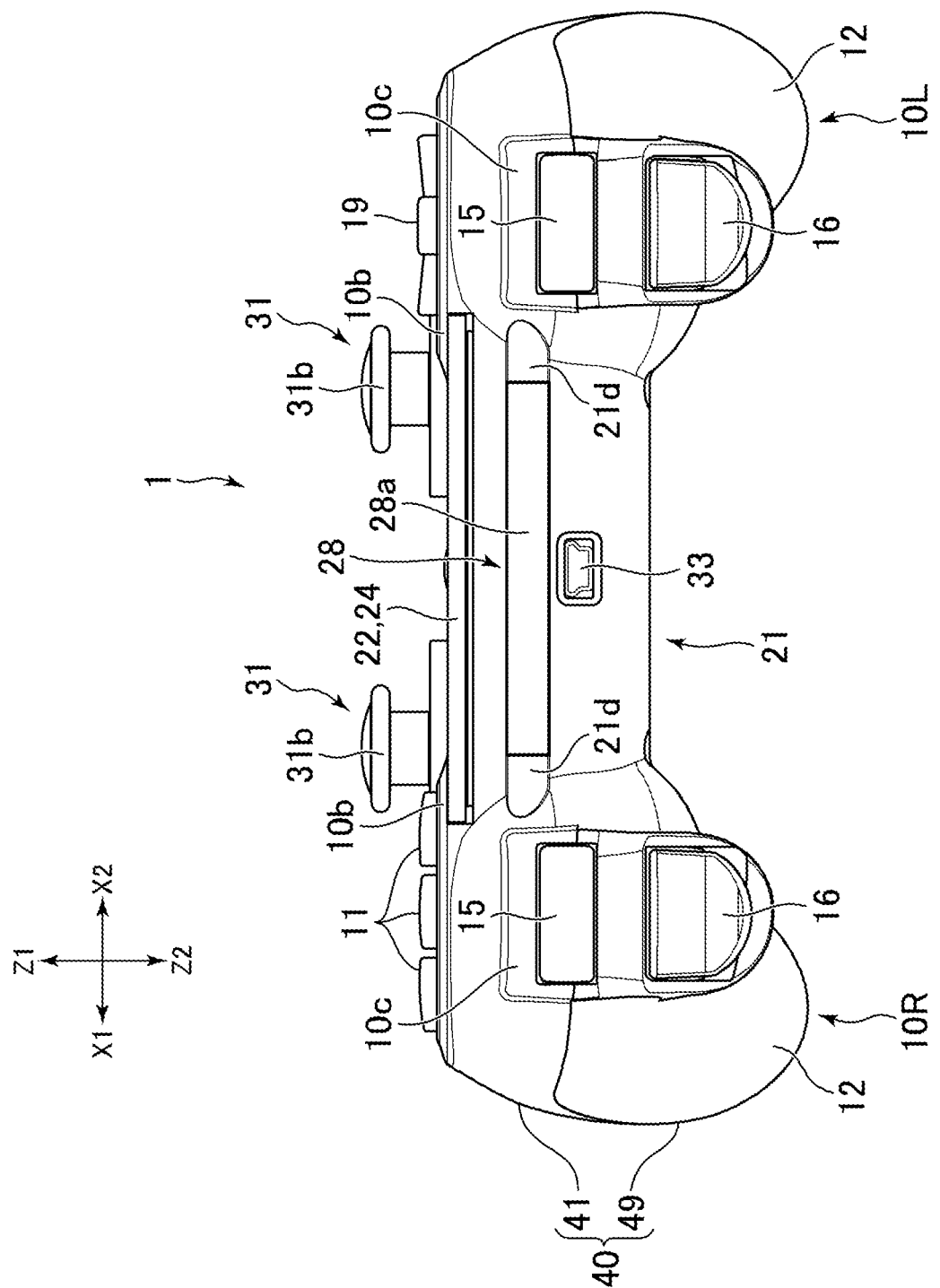
FIG. 5 is a front view of the operating device shown in FIG. 1.
Figure 6:
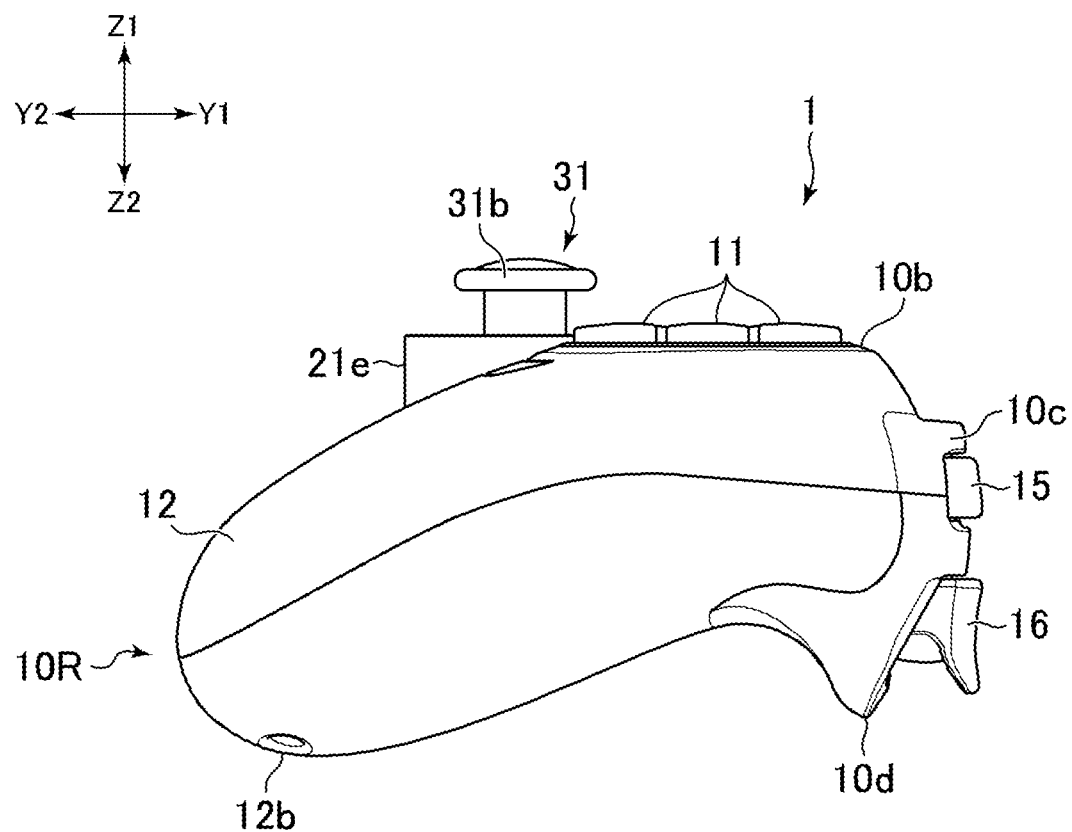
FIG. 6 is a side view of the operating device shown in FIG. 1.
Figure 7:
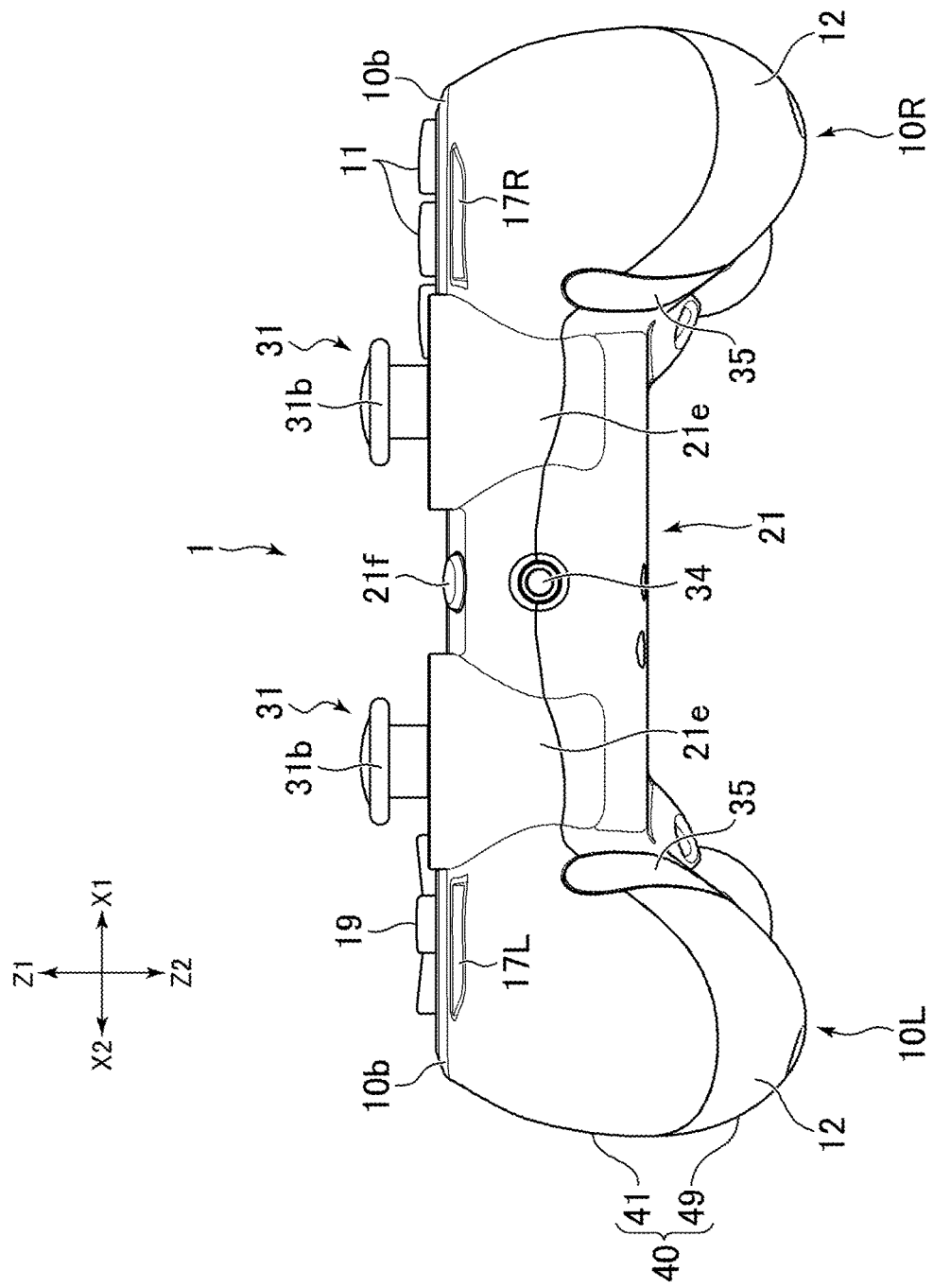
FIG. 7 is a back elevation of the operating device shown in FIG. 1.
Figure 8:
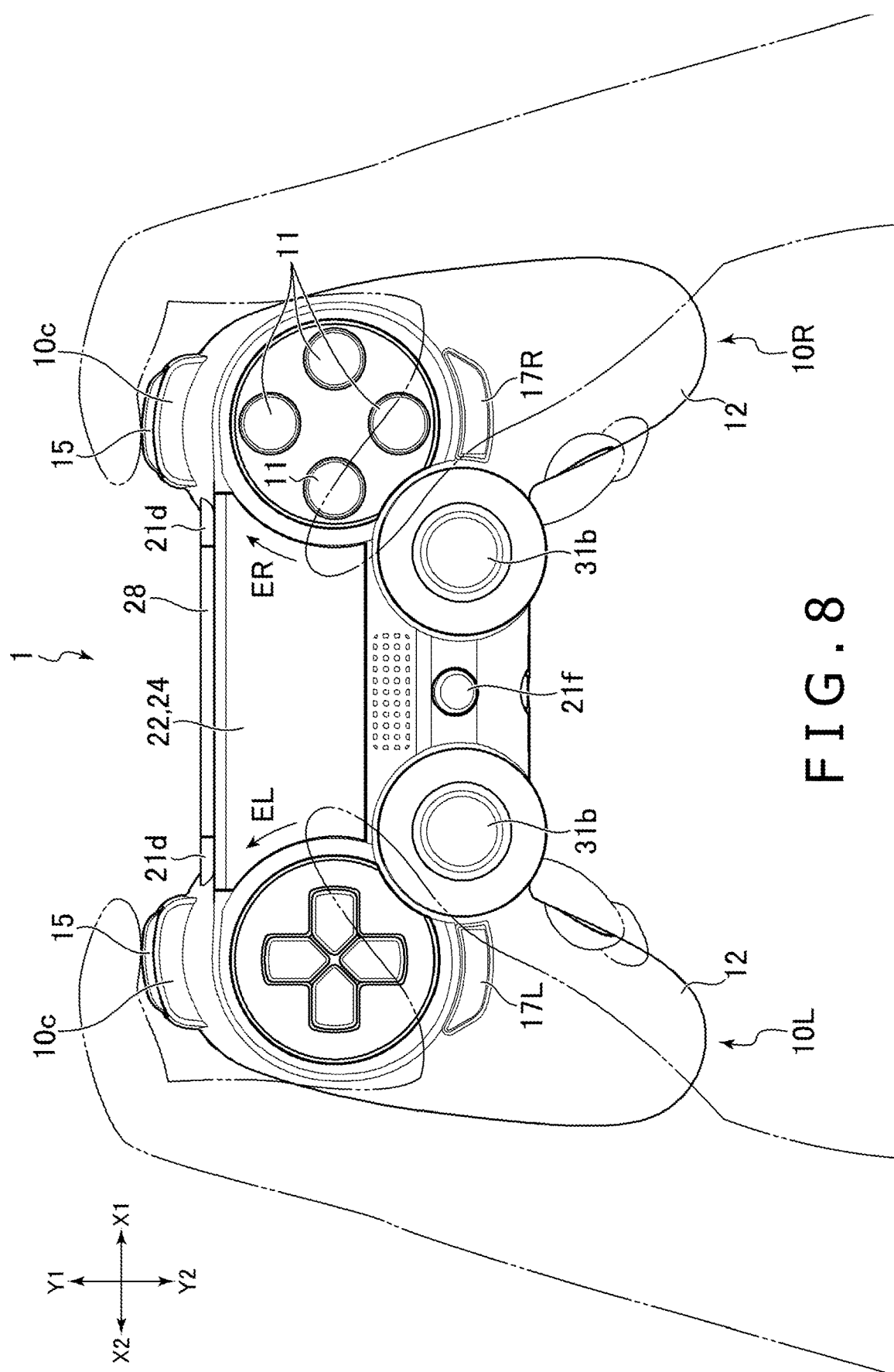
FIG. 8 is a diagram illustrating a mode of use of the operating device shown in FIG. 1.

Examples of an operating device will be described below referring to the drawings. FIGS. 1 and 2 are perspective views of an operating device 1 as a first example. FIG. 1 shows an upper side of the operating device 1, while FIG. 2 shows a front side of the operating device 1. FIG. 3 is a plan view of the operating device 1, and FIG. 4 is an enlarged view of a right side of FIG. 3. FIG. 5 is a front view of the operating device 1. FIG. 6 is a side view of the operating device 1. FIG. 7 is a back elevation of the operating device 1. FIG. 8 is a diagram illustrating one mode of use of the operating device 1.

In the following description, Y1 and Y2 shown in FIG. 1 indicate the forward direction and the backward direction, respectively. In addition, X1 and X2 indicate the rightward direction and the leftward direction, respectively. Further, Z1 and Z2 indicate the upward direction and the downward direction, respectively.

The operating device 1 is utilized as an input device for an information processing apparatus which has such functions as a function of executing game programs, a function of reproducing motion picture images, or a function of communication through the internet. The operating device 1 is capable of communication, in a wired or wireless manner, between itself and the information processing apparatus. The operating device 1 transmits to the information processing apparatus signals according to operations conducted on the operating device 1 by a user. The operating device 1 incorporates therein various sensors (acceleration sensor, gyro sensor, etc.) utilized for detection of the attitude and motions of the operating device 1, a battery, etc.

As shown in FIG. 1, the operating device 1 has at a left portion and a right portion thereof left and right hold sections 10L and 10R to be held by the user. The hold sections 10L and 10R are located to be spaced from each other in the left-right direction, and their front portions are interconnected by a central section 21. At upper surfaces of the front portions of the hold sections 10L and 10R are provided operating members to be operated by the user. At the upper surface of the front portion of the hold section 10R on the right side are provided a plurality of operating buttons 11. The operating device 1 in this example has four operating buttons 11, which are located at end portions of a cross. At the upper surface of the front portion of the hold section 10L on the left side is provided a direction key 19 having a cross-like shape. The hold sections 10L and 10R each have a grip 12. The grips 12 extend rearward from the front portions of the hold sections 10L and 10R.

As shown in FIG. 1, the operating device 1 has a housing 40. The housing 40 forms an outer surface of the operating device 1, and accommodates therein various component parts possessed by the operating device 1. The housing 40 in this example has an upper housing half 41 and a lower housing half 49, which are combined with each other in the vertical direction. The upper housing half 41 forms upper-side portions of the hold sections 10L and 10R and the central section 21, and the lower housing half 49 forms lower-side portions of the hold sections 10L and 10R and the central section 21

As shown in FIG. 3, the operating device 1 has a plate-shaped operating member 22 at an upper surface of the central section 21. The operating member 22 includes a touch sensor 23 and a face panel 24 (in FIG. 3, the face panel 24 is crosshatched for clarification). The face panel 24 forms the upper surface of the central section 21. In other words, the upper housing half 41 is formed with an opening 42 for exposing the upper surface (face) of the face panel 24. The face panel 24 covers the whole body of the touch sensor 23. The touch sensor 23 is mounted to a lower surface (back surface) of the face panel 24. The touch sensor 23 is located between the operating members (namely, the operating buttons 11 and the direction key 19) possessed by the left and right hold sections 10L and 10R. The touch sensor 23 is a sensor for detecting the position of a user's finger touching the operating member 22. In other words, the touch sensor 23 outputs a signal according to the position of the user's finger. The operating device 1 transmits the signal to the information processing apparatus. The touch sensor 23 is a sensor of a capacitance type, for example. The touch sensor 23 is capable of so-called multi-touch. In other words, the touch sensor 23 can simultaneously detect the positions of a plurality of fingers. For example, the touch sensor 23 can simultaneously detect the position of the right thumb and the position of the left thumb. The operating member 22 is so supported as to be capable of vertical movement in response to a user's pressing-down operation. The operating device 1 has a switch for detecting that the operating member 22 is pressed. The operating member 22 functions as a button capable of on-off operations.

Since the operating member 22 is plate-like in shape, the distance between a right edge 24a of the operating member 22 and the operating buttons 11 as well as the distance between a left edge 24c of the operating member 22 and the direction key 19 can be reduced (in this description, the right edge 24a and the left edge 24c are respectively the right edge and the left edge of the surface of the face panel 24 exposing via the opening 42 of the upper housing half 41). This enables the user to operate the operating member 22 with a thumb or thumbs while holding the hold sections 10R and 10L (see FIG. 8). As above-mentioned, the operating member 22 has both the function of detecting a position or positions by the touch sensor 23 and the function of detecting the user's pressing-down operation. Therefore, it is possible, for example, to detect what position or positions the operating member 22 is touched at. Specifically, since the touch sensor 23 has the multi-touch function, it is possible to detect a situation where the operating member 22 is simultaneously touched at a plurality of positions.

As shown in FIG. 3, the face panel 24 in this example is larger in size in the left-right direction than the touch sensor 23. The touch sensor 23 is rectangular in shape, and its lateral width is constant along the front-rear direction. On the other hand, the lateral width of the face panel 24 gradually increases along the forward direction. The face panel 24 has a right projecting part 24R spreading rightward beyond the right edge of the touch sensor 23, and a left projecting part 24L spreading leftward beyond the left edge of the touch sensor 23. This structure enables the user to easily press the projecting parts 24R and 24L of the operating member 22, even in the case where the touch sensor 23 has to be reduced in size due to positional relations between the touch sensor 23 and other component parts.

As shown in FIG. 3, the hold section 10R has at the upper surface of the front portion thereof an area (hereinafter referred to as operation area) AR in which the four operating buttons 11 are disposed. Similarly, the hold section 10L has at the upper surface of the front portion thereof an operation area AL in which the direction key 19 is disposed. The operation areas AR and AL in this example are substantially circular in shape. The touch sensor 23 has a lateral width corresponding to a distance Dl between a rightmost portion of the operation area AL on the left side and a leftmost portion of the operation area AR on the right side. On the other hand, a frontmost portion of the face panel 24 has a lateral width W1 greater than the distance Dl.

As shown in FIG. 3, the right edge 24a of the face panel 24 is curved so as to surround a portion at the left side of the four operating buttons 11. Specifically, the right edge 24a extends from a position on the left side of the four operating buttons 11 while being curved forward and rightward. A front end 24b of the right edge 24a (the right end of the frontmost portion of the operating member 22) is located forwardly of the operating buttons (more specifically, the operating button 11 located closest to the center in the left-right direction). The right edge 24a is curved along the outer peripheral edge of the operation area AR, and is arcuate in shape.

The left edge 24c of the face panel 24 is curved so as to surround a portion at the right side of the direction key 19. Specifically, the left edge 24c extends from a position on the right side of the direction key 19 while being curved forward and leftward. A front end 24d of the left edge 24c (the left end of the frontmost portion of the operating member 22) is located forwardly of a most right-side portion 19a of the direction key 19. The left edge 24c is curved along the outer peripheral edge of the operation area AL, and is arcuate in shape.

When the user slides his/her thumb in the front-rear direction while holding the hold sections 10R and 10L, the locus of the thumb is substantially an arc of a circle. The edges 24a and 24c of the face panel 24 are provided at positions which can be reached by the user's thumbs in a condition where the user is holding the hold sections 10R and 10L. In addition, the curvatures of the edges 24a and 24b substantially agree with the loci of the thumbs. This permits the user to easily slide his/her thumbs forward along the edges 24a and 24c from the inside of the operation areas AR and AL, as indicated by arrows ER and EL in FIG. 8. Even in the case where the thumb slides beyond the right or left edge of the touch sensor 23, the user can press the projecting part 24R or 24L.

As shown in FIG. 1, the upper surfaces of the operation areas AR and AL are located at positions slightly higher than the surrounding portions. At outer peripheral edges of the operation areas AR and AL are formed steps 10b which surround the operation areas AR and AL. The edges 24a and 24c of the face panel 24 are formed along the steps 10b. Therefore, the user can move his/her fingers along the edges 24a and 24c without looking at the operating member 22. The front surfaces (upper surfaces) of the steps 10b are inclined to become lower toward the outside of the operation areas AR and AL. This permits the user to smoothly move his/her fingers from the operation areas AR and AL toward the operating member 22. In the example described here, the steps 10b are formed in substantially annular shapes such as to surround the operation areas AR and AL. The steps 10b may not necessarily be formed.

As shown in FIG. 2, a front edge of the operating member 22, or a front edge 24e of the face panel 24, forms the front edge of the upper surface of the central section 21. In other words, the upper surface of the upper housing half 41 of the operating device 1 which forms the outer shape of the central section 21 does not have any edge that is located on the more front side than the front edge 24e of the face panel 24. The front edge 24e of the face panel 24 is located at a front surface 21a of the central section 21. According to this structure, a portion on which the user's finger might be caught is not present on the front side of the front edge 24e of the face panel 24; therefore, the user can smoothly slide his/her fingers forward beyond the front edge 24e. In addition, the user can easily press the front edge 24e of the face panel 24. Incidentally, the structure of the operating member 22 is not restricted to the just-mentioned one; for example, the operating member 22 may be supported by a shaft on the rear side so that the operating member 22 is lowered only on the front side.

Figure 9:
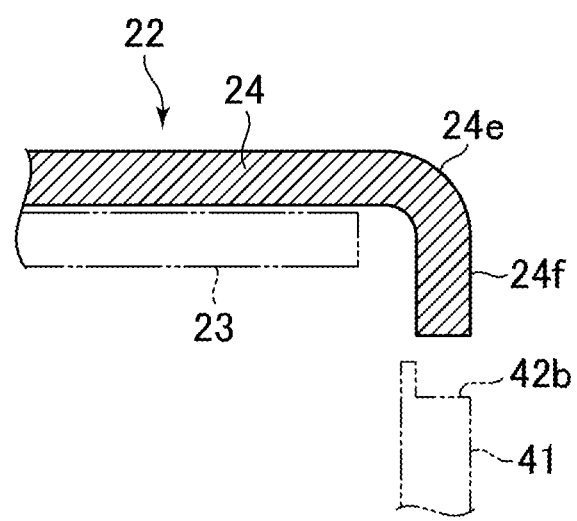
FIG. 9 is a sectional view of a face panel taken along line IX-IX of FIG. 3.

The operating member 22 forms the upper surface of the central section 21, as above-mentioned. The operating member 22 includes at a frontmost portion thereof a part which extends from the portion forming the upper surface of the central section 21 and which forms a front surface of the central section 21. FIG. 9 is a sectional view of the face panel 24 taken along line IX-IX of FIG. 3. As shown in FIG. 9, a frontmost portion of the face panel 24 in this example is substantially L-shaped in section. Specifically, the face panel 24 has a front surface portion 24f which extends from the front edge 24e and which forms the front surface of the central section 21. The upper housing half 41 of the operating device 1 is formed with the opening 42 through which the surface of the face panel 24 is exposed. A front edge 42b of the opening 42 is located on the lower side of the face panel 24, specifically on the lower side of a lower edge of the front surface portion 24f.

Figure 10:
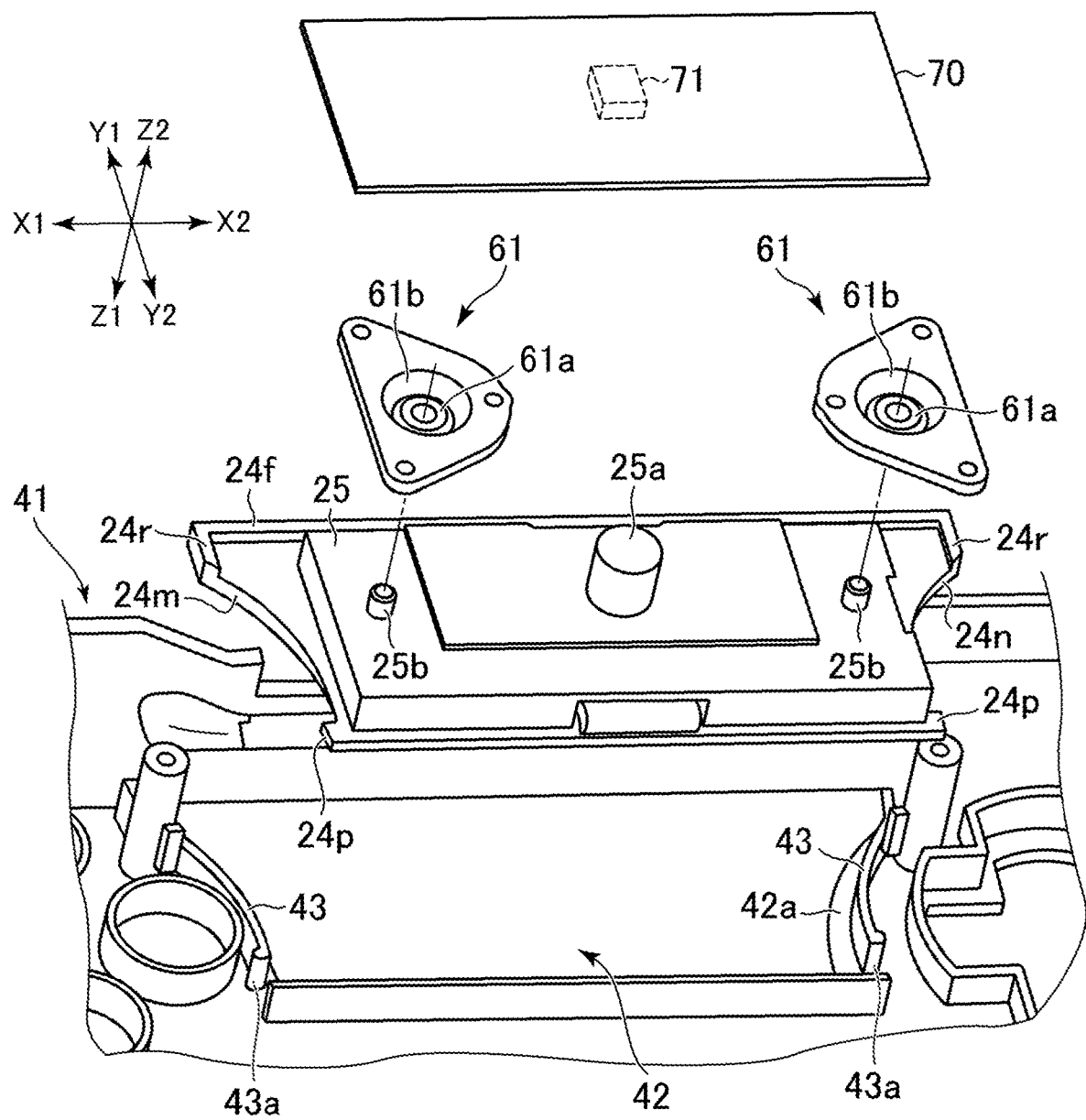
FIG. 10 is an exploded perspective view of an example of an internal structure of the operating device shown in FIG. 1.

The upper housing half 41 is formed with a stopper portion which regulates forward movement of the operating member 22. The stopper portion is formed, for example, at each of the left and the right of the operating member 22. FIG. 10 is an exploded perspective view showing one example of the internal structure of the operating device 1. In the figure, back surfaces (lower surfaces) of the upper housing half 41 and the operating member 22 are shown. As above-mentioned, the upper housing half 41 is formed with the opening 42. The upper housing half 41 is formed with two stopper portions 43 at the lower surface thereof. The stopper portions 43 are formed at the left and the right of the operating member 22. The two stopper portions 43 in this example are in the shape of walls respectively present along a right-side end face 24m and a left-side end face 24n of the face panel 24. The face panel 24 has to-be-stopped portions 24p which project outward in the left-right direction from the end faces 24m and 24n. The to-be-stopped portions 24p are located on the rear side of rear ends 43a of the stopper portions 43. When the operating member 22 is about to move forward, the to-be-stopped portions 24p are abutted on the rear ends 43a of the stopper portions 43, resulting in that forward movement of the operating member 22 is restrained by the stopper portions 43.

Thus, the stopper portions 43 are formed as part of the upper housing half 41 forming the outer surface of the operating device 1. This results in that the tolerance of the position of the operating member 22 relative to the upper housing half 41 is reduced, and the external appearance of the operating device 1 can be enhanced. Besides, in this example, the to-be-stopped portions 24p are formed as part of the face panel 24 forming the outer surface of the operating device 1. This ensures that the tolerance of the position of the face panel 24 relative to the upper housing half 41 is reduced, and the external appearance of the operating device 1 can be further enhanced. In addition, the structure wherein the to-be-stopped portions 24p are formed at left and right edges of the face panel 24 enables the area of contact between the to-be-stopped portions 24p and the upper housing half 41 to be reduced, as compared, for example, with a structure wherein the lower edge of the front surface portion 24f provided at the frontmost portion of the face panel 24 functions as a to-be-stopped portion. As a result, resistance against a user's operation of pressing down an operation panel 50 can be reduced. Incidentally, the positions of the stopper portions 43 and the to-be-stopped portions 24p are not restricted to the above-mentioned ones. For instance, the to-be-stopped portions 24p may be provided at frontmost portions of the right-side end face 24m and the left-side end face 24n of the face panel 24.

The operating member 22 is so supported as to be capable of vertical movement when the operating member 22 is pressed, irrespectively of the position of pressing. Specifically, when any of the front edge 24e, a rear edge 24g, the right edge 24a, the left edge 24c, and portions on the inner side of these edges of the face panel 24 is pressed, the pressed portion is lowered. On the back surface side of the operating member 22 are disposed a plurality of elastic members (for example, springs or rubber members) which generate a reaction force when the operating member 22 is pressed.

In the example shown in FIG. 10, two elastic members 61 which bias the operating member 22 upward are disposed on the back surface side of the operating member 22. The elastic members 61 are attached, for example, to a circuit board 70 (described later) which is disposed on the back surface side of the operating member 22. In addition, a configuration may be adopted wherein a frame is disposed between the circuit board 70 and the operating member 22, and the elastic members 61 are attached to the frame.

The elastic members 61 in this example are formed of rubber. The elastic members 61 each have a cylindrical contact portion 61a having a top face coming into contact with a lower surface of the operating member 22. The elastic members 61 each have an annular elastic portion 61b which surrounds a lower surface of the contact portion 61a. When a front portion of the operating member 22 is pressed, the contact portions 61a are tilted toward the front side, and, when a rear portion of the operating member 22 is pressed, the contact portions 61a are tilted toward the rear side. When the contact portions 61a are thus tilted, the elastic portions 61b exhibit forces which resist the tilting. In addition, the two elastic members 61 are located to be spaced from each other along the left-right direction. Therefore, the two elastic members 61 generate reaction forces when the operating member 22 is pressed, irrespectively of the position of pressing. The operating member 22 in the example shown in FIG. 10 has a frame 25 which covers a back surface (lower surface) of the touch sensor 23. The contact portions 61a are in contact with a lower surface of the frame 25. Incidentally, a rightmost portion and a leftmost portion of the face panel 24 are located on the lower side of the left and right edges 24a of the opening 42. An upward movement of the operating member 22 by elastic forces generated by the elastic members 61 is regulated by the left and right edges 24a.

On the back surface side of the operating member 22, a plurality of springs for biasing the operating member 22 upward may be disposed, instead of the elastic members 61. In this case, also, these springs are so disposed as to generate reaction forces when the operating member 22 is pressed, irrespectively of the position of pressing. For instance, the springs are so disposed as to bias the operating member 22 upward, at four points which are spaced from one another in the front-rear direction and the left-right direction.

One of the lower surface of the operating member 22 and each of the elastic members 61 is formed with a projection, whereas the other is formed with a hole into which the projection is fitted. In the example illustrated in FIG. 10, the lower surface of the frame 25 is formed with projections 25b, whereas the contact portions 61a of the elastic members 61 are formed with holes into which the projections 25b are fitted. This structure ensures that even in the case where the position of the operating member 22 is slightly shifted as a result of sliding of a user's finger on the surface of the operating member 22, the operating member 22 is returned into its initial position by elastic forces of the elastic members 61.

On the back surface side of the operating member 22 is disposed the circuit board 70. A switch 71 to be pressed by the operating member 22 is disposed on the circuit board 70. The operating member 22 has a pressing part 25a at a central portion of the lower surface thereof (more specifically, the lower surface of the frame 25). The above-mentioned elastic members 61 are disposed on the left and the right of the pressing part 25a. When part of an outer peripheral portion of the operating member 22 is pressed, the operating member 22 is tilted. For example, when a right-side part of the operating member 22 is pressed, the right-side part is lowered, so that the operating member 22 is tilted. With the operating member 22 thus tilted, the position of the pressing part 25a is lowered, so that the pressing part 25a presses the switch 71. In short, the operating member 22 can press the switch 71 when its surface is pressed at any position thereof. In other words, when the operating member 22 is pressed by the user at any position thereof, the operating device 1 can detect the user's operation, based on an output signal from the switch.

As above-mentioned, the face panel 24 has the front surface portion 24f. The front surface portion 24f enables an increase in rigidity of the frontmost portion of the face panel 24. This makes it possible to restrain the face panel 24 from bending when the face panel 24 is pressed by the user. As a result, even when part of an outer peripheral portion of the face panel 24 is pressed by the user, the pressing-down operation is clearly transmitted to the switch 71. The face panel 24 in this example has downwardly extending portions at the right side and the left side thereof. More in detail, the face panel 24 has downwardly extending side surface portions 24r at the front end of the right-side end face 24m and at the front end of the left-side end face 24n. This enables a further increase in the rigidity of the face panel 24. In addition, the operating member 22 has the frame 25 on the back surface side thereof. The frame 25 permits a further enhancement of the rigidity of the operating member 22.

The operating device 1 has left and right operating sticks 31 at rear portions of the central section 21 (see FIG. 3). As shown in FIG. 1, the operating sticks 31 extend upward from the central section 21, and each have at the upper end thereof a circular to-be-operated portion 31b to be touched by a user's finger. The height of the operating members provided at the upper surfaces of the hold sections 10R and 10L (namely, the operating buttons 11 and the direction key 19) is smaller than the height (length) of the operating sticks 31. The operating stick 31 can, for example, be tilted in the radial direction thereof and be rotated in a tilted state. The operating device 1 detects the tilting direction and the amount of tilting of each of the operating sticks 31, and transmits signals corresponding to the detection results to the information processing apparatus. Besides, the operating sticks 31 may each be slidable in the radial direction thereof. In this case, the operating device 1 detects moving amounts of the operating sticks 31 in prescribed mutually orthogonal two directions (for example, moving amounts in the front-rear direction and moving amounts in the left-right direction), and transmits signals corresponding to the detection results to the information processing apparatus.

As shown in FIG. 3, the operating member 22 is provided at a front portion of the upper surface of the central section 21. The left and right operating sticks 31 are located on the rear side of the operating member 22. The right edge 24a and the left edge 24c of the face panel 24 are located on the front side of the operating sticks 31. This layout restrains the operating sticks 31 from obstructing the sliding of a finger or fingers along the edges 24a and 24c (see FIG. 8). In this example, the front end of the right edge 24a, or the right end 24b of the frontmost portion of the face panel 24, is located rightwardly of the center C of the right operating stick 31. The front end of the left edge 24c, or the left end 24d of the frontmost portion of the face panel 24, is located leftwardly of the center C of the left operating stick 31.

As shown in FIG. 6, the grips 12 obliquely extend rearward and downward from the front portions of the hold sections 10R and 10L. The hold sections 10R and 10L have projecting parts 10c projecting forward and downward from front surfaces thereof. The projecting part 10c is provided with operating buttons 15 and 16. This shape facilitates the manner of holding the hold sections 10R and 10L by placing the index fingers on the operating buttons 15 and 16 and placing the thumbs on the operating member 22 while gripping the grips 12.

Incidentally, the operating device 1 may be so formed that the operating member 22 is horizontal when the operating device 1 is placed on a horizontal plane. Specifically, the shape of the projecting parts 10c (the height of lower ends 10d of the projecting parts 10c) and the shape of the grips 12 (the height of lower ends 12b of rearmost portions of the grips 12) may be so set that a plane containing the lower ends 12b and the lower ends 10d is parallel to the operating member 22. This setting ensures that fingers can be easily slid on the operating member 22 even in a condition where the operating device 1 is placed on a horizontal plane. At the lower ends 12b of the grips 12 and the lower ends 10d of the projecting parts 10c, there may be provided members (for example, rubber members) for protecting these lower ends 12b and 10d. This makes it possible to prevent the lower ends 12b and 10d from being marred.

The operating buttons 15 and 16 provided at the projecting part 10c are aligned with each other along the vertical direction. The operating button 15 is, for example, a button capable of on-off operations. The operating button 16 is, for example, an analog button capable of detecting the user's pressing amount. As shown in FIG. 3, the front edge 24e of the operating member 22 is located on the rear side relative to the operating buttons 15 and 16.

The central section 21 incorporates a speaker therein. The speaker is located between the left and right operating sticks 31. As shown in FIG. 1, the upper surface of the central section 21 has sound-passing holes 21c at a position corresponding to the speaker. This layout of the speaker and the sound-passing holes 21c permits the user to easily hear a sound outputted by the operating device 1. Incidentally, a microphone may be disposed at the position of the sound-passing holes 21c, in place of the speaker.

As shown in FIG. 1, an operating button 21f to be used at a comparatively low frequency is disposed between the left and right operating sticks 31. The operating button 21f is used, for example, for returning a display connected to the information processing apparatus to a home image (for instance, a menu image for selection of a software to be executed by the information processing apparatus).

As above-mentioned, the plurality of (in this example, four) operating buttons 11 are disposed at the upper surface of the front portion of the hold section 10R. As shown in FIG. 4, the hold section 10R incorporates therein a plurality of (in this example, four) light emitting elements 13 corresponding respectively to the plurality of operating buttons 11 (in FIG. 4, the light emitting elements 13 are indicated by solid circles for clarification). The light emitting elements 13 are, for example, light emitting diodes. In one example, the operating device 1 changes the turned-on state of the light emitting elements 13 according to the operating conditions of the information processing apparatus and the operating device 1. For instance, in the case where the information processing apparatus demands the user to press the operating button 11, the operating device 1 turns on the light emitting element 13 corresponding to the operating button 11 demanded to be pressed, or causes this light emitting element 13 to blink. The plurality of light emitting elements 13 shine in different colors, for example. The colors of the light emitting elements 13 may change according to the operating conditions of the operating device 1 and/or the information processing apparatus. The operating device 1 may keep the light emitting element or elements 13 on whenever the operating device 1 is operating (whenever a power source is on).

As shown in FIG. 4, the light emitting elements 13 are disposed not at the operating buttons 11 themselves but adjacently to the operating buttons 11. Specifically, the plurality of light emitting elements 13 are disposed at mutually spaced positions such as to surround the whole group of the plurality of operating buttons 11. This layout of the light emitting elements 13 ensures that the user can see the light of the light emitting element or elements 13 even when the operating button or buttons 11 are hidden behind a user's finger. In this example, the four light emitting elements 13 are arranged on the circumference of a circle surrounding the four operating buttons 11. To be more specific, the light emitting elements 13 are arranged on the outer peripheral edge of the operation area AR. Each of the light emitting elements 13 is located on the outside in the radial direction of the operation area AR, relative to the corresponding operating button 11. This layout of the light emitting elements 13 permits the user to clearly recognize the correspondence between the light emitting elements 13 and the operating buttons 11.

As shown in FIG. 4, the hold section 10R has a light guide member 14 at the upper surface thereof (in FIG. 4, the light guide member 14 is cross-hatched for clarification). The light emitting elements 13 are disposed on the lower side (back side) of the light guide member 14, and the light guide member 14 transmits therethrough the light of the light emitting elements 13 to the upper surface of the hold section 10R. The light guide member 14 is a single member so shaped as to surround the plurality of operating buttons 11. This structure including the light guide member 14 enables a reduction in the number of component parts, as compared with a structure wherein mutually independent light guide members are provided respectively for the light emitting elements 13. The light guide member 14 in this example is substantially annular in shape, and is disposed along the outer peripheral edge of the operation area AR. To be more specific, the light guide member 14 is arranged on the inner side of the step 10b.

The light emitting elements 13 and the light guide member 14 may be provided also at the hold section 10L on the left side. In that case, the plurality of light emitting elements 13 are so arranged as to surround the direction key 19, and correspond respectively to four end portions of the direction key 19.

As above-mentioned, the hold sections 10R and 10L have projecting parts 10c at the front surfaces thereof. As shown in FIG. 2, a light emitting part 28 is provided at the front surface 21a of the central section 21. The light emitting part 28 is located between the left and right projecting parts 10c. This layout of the light emitting part 28 ensures that the light emitting part 28 can be prevented from being hidden behind the user's hand or finger in the condition where the user is holding the hold sections 10R and 10L.

The information processing apparatus acquires the light of the light emitting part 28 through a camera connected to the information processing apparatus. The information processing apparatus processes an image obtained through the camera, and detects the position of the operating device 1 on the basis of the position and/or size of the light emitting part 28 in the image acquired. For instance, in the case where a plurality of users respectively use a plurality of operating devices 1 and respectively operate a plurality of objects (characters) displayed on a screen, the positions of the objects and the positions of the operating devices 1 can be made to correspond to each other. For example, the object relevant to the user operating the operating device 1 on the right side can be displayed on the right side, whereas the object relevant to the user operating the operating device 1 on the left side can be displayed on the left side. The light emitting part 28 can shine in arbitrary colors. For instance, the light emitting part 28 includes red, green and blue light emitting elements (e.g., light emitting diodes), and the brilliance of each of the light emitting elements are controlled so that the light emitting part 28 shines in a color designated by the information processing apparatus or in a color according to the operating conditions of the operating device 1. This ensures that even where a plurality of operating devices 1 are used simultaneously, the information processing apparatus can detect the positions of the operating devices 1.

As shown in FIGS. 2 and 5, the light emitting part 28 is shaped to be elongate in the left-right direction. This enables the color of the light emitting part 28 to be easily discriminated from other lights present in the image acquired through the camera. As a result, the position detection performance of the operating device 1 can be enhanced. In the example shown in FIG. 2, the light emitting part 28 is in the shape of a rod extending rectilinearly. This shape ensures that the shape of the light emitting part 28 in the image obtained by the camera can be restrained from varying depending on the attitude of the operating device 1. Specifically, in the case where the operating device 1 is disposed obliquely relative to the camera, the light emitting part 28 in the image acquired by the camera does not change in shape although it changes in length. Consequently, the performance of position detection by the operating device 1 through the camera can be enhanced. Incidentally, the shape of the light emitting part 28 is not restricted to the just-mentioned one; for example, the light emitting part 28 may be V-shaped or may be curved in an arcuate shape.

As shown in FIG. 2, the light emitting part 28 has a light diffusing member 28a which is located at a front surface of the central section 21 and is elongated in the left-right direction. The length of the light diffusing member 28a in the left-right direction is greater than the width of the light diffusing member 28a in the vertical direction (see FIG. 5). The above-mentioned light emitting elements are disposed on the rear side of the light diffusing member 28a. The light diffusing member 28a transmits the lights of the light emitting elements to the front surface of the central section 21. This ensures that the whole body of the light emitting part 28 shines substantially uniformly, in the case where a single light emitting element is disposed on the rear side of the light diffusing member 28a or even in the case where a plurality of light emitting elements are arranged dispersedly in the left-right direction.

As shown in FIG. 2, the light diffusing member 28a projects forward from the front surface 21a of the central section 21. Therefore, a light emitting surface of the light diffusing member 28a includes not only a forwardly oriented portion but also an upwardly oriented portion and a downwardly oriented portion. This facilitates acquisition of the light of the light emitting part 28 by the camera. Since the light diffusing member 28a projects from the front surface 21a of the central section 21, the light diffusing member 28a can be looked at even when the operating device 1 is seen in a plan-view manner, as shown in FIG. 3. Therefore, the user can check the light emitting condition of the light emitting part 28 (whether the light emitting part 28 is emitting light or not, or the color) while holding the operating device 1. As above-mentioned, the front edge of the plate-shaped operating member 22 (more specifically, the front edge 24e of the face panel 24) forms the front edge of the upper surface of the central section 21 of the operating device 1. As shown in FIG. 3, the light emitting part 28 is located forwardly of the front edge 24e of the face panel 24. Therefore, the user can visually confirm the light of the light emitting part 28 even when pressing the front edge 24e of the face panel 24. In addition, the camera can catch the light of the light emitting part 28, without any hindrance by the user's finger or fingers. Incidentally, the light diffusing member 28a may not necessarily project forward.

As shown in FIG. 2, the projection amount of the light diffusing member 28a is smaller than the projection amount of the projecting parts 10c each provided with the operating buttons 15 and 16. Therefore, external forces can be prevented from acting on the light diffusing member 28a from the right side or the left side of the light diffusing member 28a. In other words, the light diffusing member 28a can be protected by the projecting parts 10c. The front surface 21a of the central section 21 is provided with protuberant parts 21d which are located at the left and the right of the light diffusing member 28a. The light diffusing member 28a and the protuberant parts 21d form a series of protruding parts extending in the left-right direction. The series of protruding parts is continuous with base portions of the left and right projecting parts 10c each provided with the operating buttons 15 and 16. This ensures that external forces can be effectively prevented from being exerted on the light diffusing member 28a. Incidentally, a configuration may be adopted wherein the central section 21 is not provided with such protuberant parts 21d, and end portions of the light diffusing member 28a are continuous with the base portions of the projecting parts 10c.

As shown in FIG. 2, a connector 33 is provided at the front surface of the central section 21. To the connector 33 is connected, for example, a cable for interconnecting the operating device 1 and the information processing apparatus. The connector 33 is located on the lower side of the light diffusing member 28a. As above-mentioned, the light diffusing member 28a is shaped to extend in the left-right direction, and projects forward. Therefore, an end portion of the cable can be protected by the light diffusing member 28a in the condition where the cable is connected to the connector 33.

As shown in FIGS. 1 and 7, a connector 34 is provided at a rear surface of the central section 21. To the connector 34 is connected, for example, a cable of headphones or earphones. In addition, other device for extending the function of the operating device 1 may be connected to the connector 34.

As shown in FIG. 1, the hold sections 10R and 10L respectively have operating buttons 17R and 17L on the rear side of the operating members (the operating buttons 11 and the direction key 19) provided in the operation areas AR and AL. The operating buttons 17R and 17L are buttons that are used less frequently than such operating members as the operating sticks 31, the operating buttons 11 and the direction key 19. For instance, the operating buttons 17R and 17L function as a select button for selecting one of choices displayed in a menu image or a start button for designating the starting of a game. In addition, the operating buttons 17R and 17L may be short-cut buttons for designating execution of a specified function. The specified function here is, for example, a function of transmitting game data or a user's comment to a specified server on a network.

As shown in FIG. 3, the operating button 17R on the right side is located on the outer side in the left-right direction (namely, on the right side) relative to the operating stick 31 on the right side. Specifically, the operating button 17R intersects a straight line L2 extending in the left-right direction while passing through the operating stick 31. Similarly, the operating button 17L on the left side is located on the outer side in the left-right direction (namely, on the left side) relative to the operating stick 31 on the left side. The height of the operating buttons 17R and 17L is smaller than the height of the operating sticks 31. This ensures that a finger operating the operating stick 31 can be prevented from erroneously pressing the operating button 17R or 17L.

The operating buttons 17R and 17L are located on the further outer sides of the steps 10b formed along the outer peripheral edges of the operation areas AR and AL. Specifically, the operating buttons 17R and 17L are located on the rear side of the steps 10b. As shown in FIG. 7, the height of the operating buttons 17R and 17L is smaller than the height of the steps 10b, namely, than the height of the upper surfaces of the front portions of the hold sections 10R and 10L relative to the upper surfaces of the grips 12. This ensures that a finger operating the operating member provided in the operation area AR or AL can be prevented from erroneously pressing the operating button 17R or 17L. The upper surfaces of the operating buttons 17R and 17L in this example are each flush with the upper surface of the grip 12.

As shown in FIG. 3, the operating buttons 17R and 17L are shaped to be elongate in the left-right direction. This enables the user to easily press the operating buttons 17R and 17L. Front edges 17a of the operating buttons 17R and 17L are curved along the outer peripheries of the operation areas AR and AL (see FIG. 4). This enables narrowing of the spacing between the operating button 17R or 17L and the step 10b. As a result, the user can easily press the operating buttons 17R and 17L when it is necessary to operate the operating buttons 17R and 17L.

As shown in FIGS. 3 and 4, the operating buttons 17R and 17L are each located with an offset toward the center in the left-right direction, or toward the operating stick 31, in relation to a center line L3 of the grip 12 that extends along the extending direction of the grip 12. In other words, the operating button 17R on the right side is located with a leftward offset in relation to the center line L3, whereas the operating button 17L on the left side is located with a rightward offset in relation to the center line L3. This ensures that a hand gripping the grip 12 and a finger operating the operating stick 31 would not easily touch the operating button 17R or 17L. As shown in FIG. 1, at rear portions of the central section 21 are provided hollow cylindrical parts 21e for accommodating base portions of the operating sticks 31 therein. Inside edges 17b of the operating buttons 17R and 17L (a left edge of the right-side operating button 17R and a right edge of the left-side operating button 17L) are located close to the hollow cylindrical parts 21e, and are curved along the outer peripheries of the hollow cylindrical parts 21e. As shown in FIG. 3, outside edges 17c of the operating buttons 17R and 17L (a right edge of the right-side operating button 17R and a left edge of the left-side operating button 17L) are more inclined relative to the center line L3 than the inside edges 17b. This ensures more securely that a hand gripping the grip 12 would not easily touch the operating button 17R or 17L.

As shown in FIGS. 1 and 7, the left and right grips 12 are each provided with an operating button 35. The operating buttons 35 are provided at inside surfaces of the left and right grips 12. Specifically, the operating buttons 35 are provided respectively at the right side surface of the left-side grip 12 and at the left side surface of the right-side grip 12. This layout of the operating buttons 35 enables the user to press the operating button 35 with a finger for gripping the grip (for example, with the third finger). The operating buttons 35 are shaped to be elongate in the vertical direction. This permits the user to press the operating button 35 more easily.

Second Example of Operating Device

Figure 11:
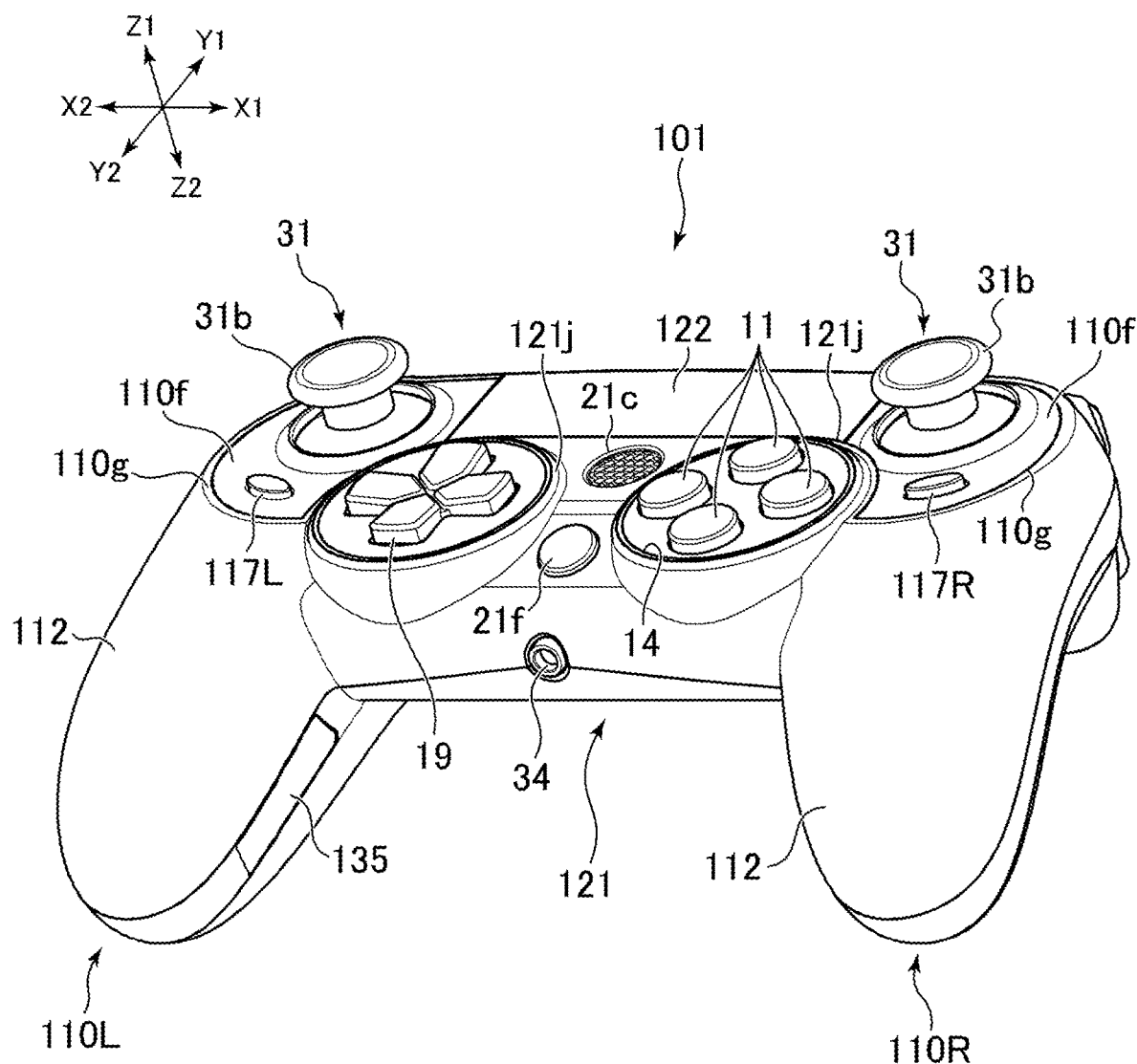
FIG. 11 is a perspective view showing an upper side of a second example of an operating device.
Figure 12:
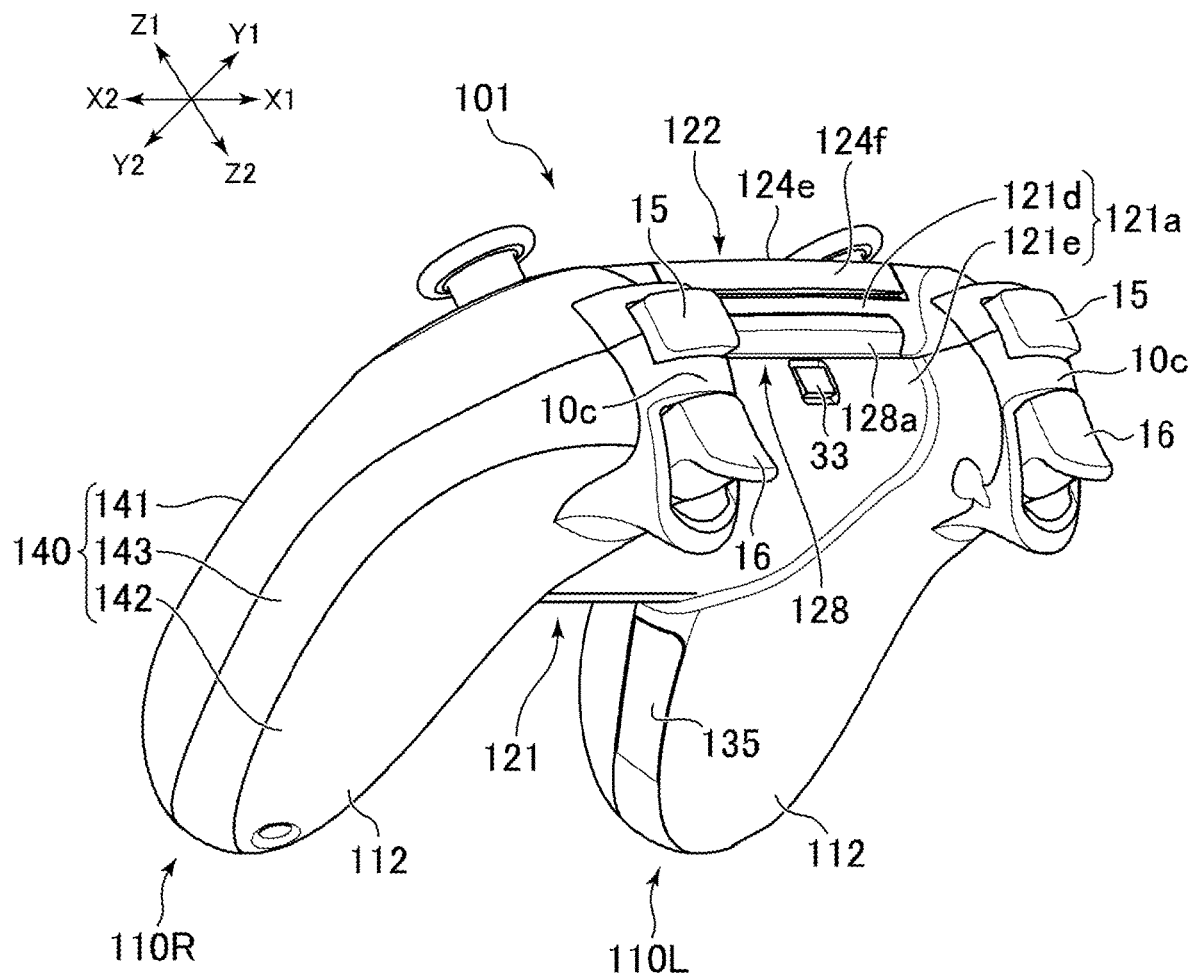
FIG. 12 is a perspective view showing a front side of the operating device shown in FIG. 11.
Figure 13:
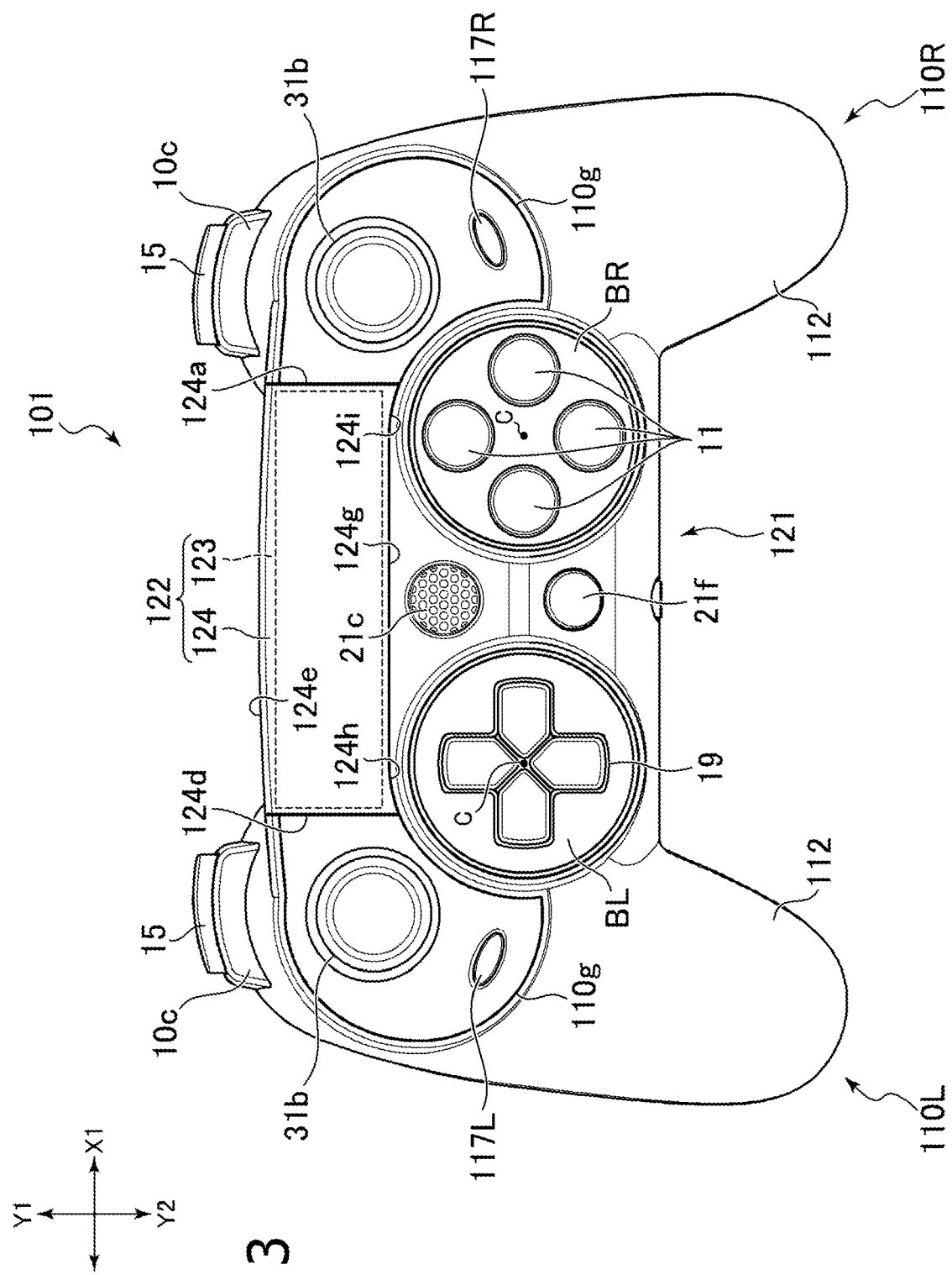
FIG. 13 is a plan view of the operating device shown in FIG. 11.
Figure 14:
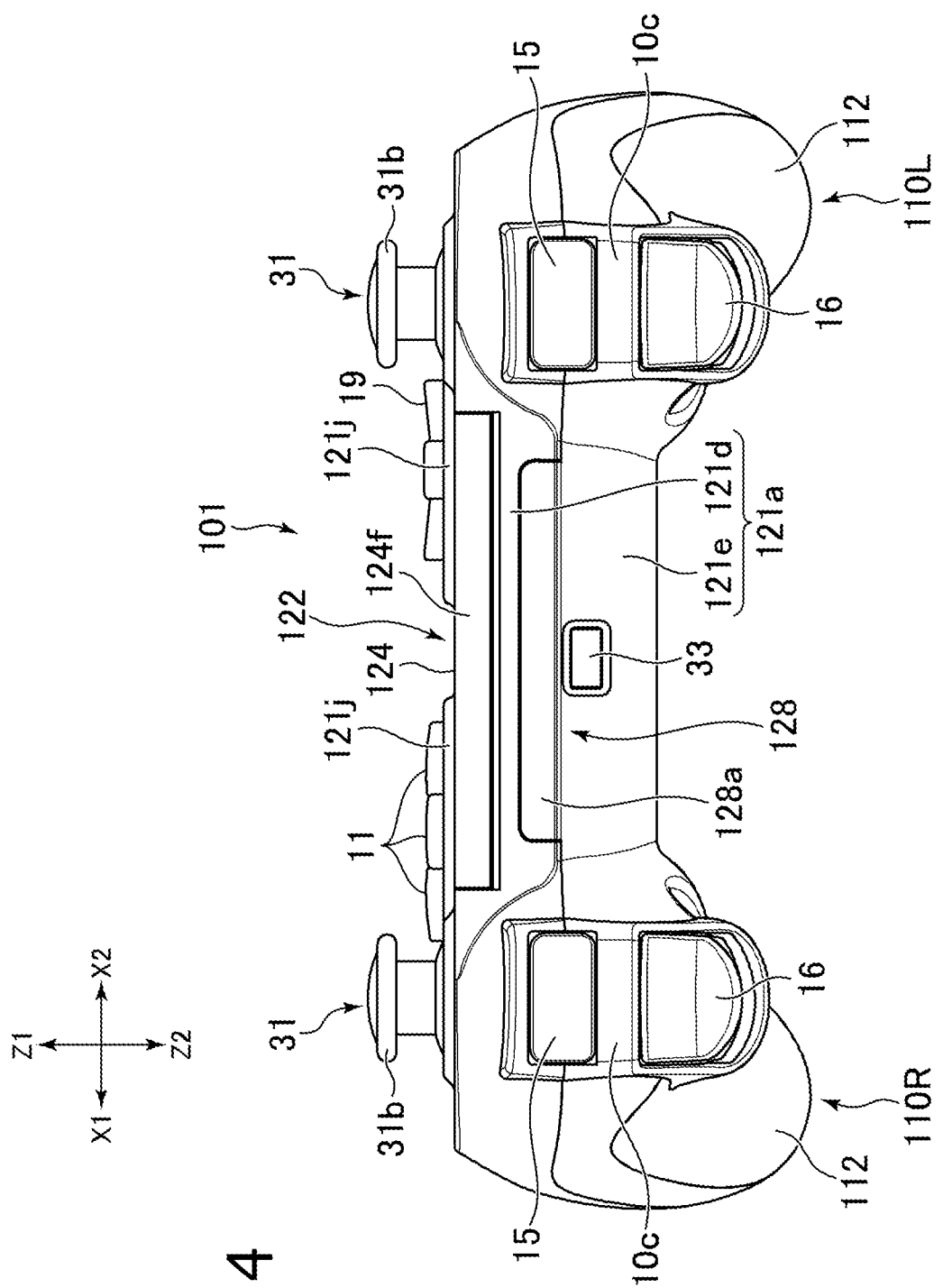
FIG. 14 is a front view of the operating device shown in FIG. 11.
Figure 15:
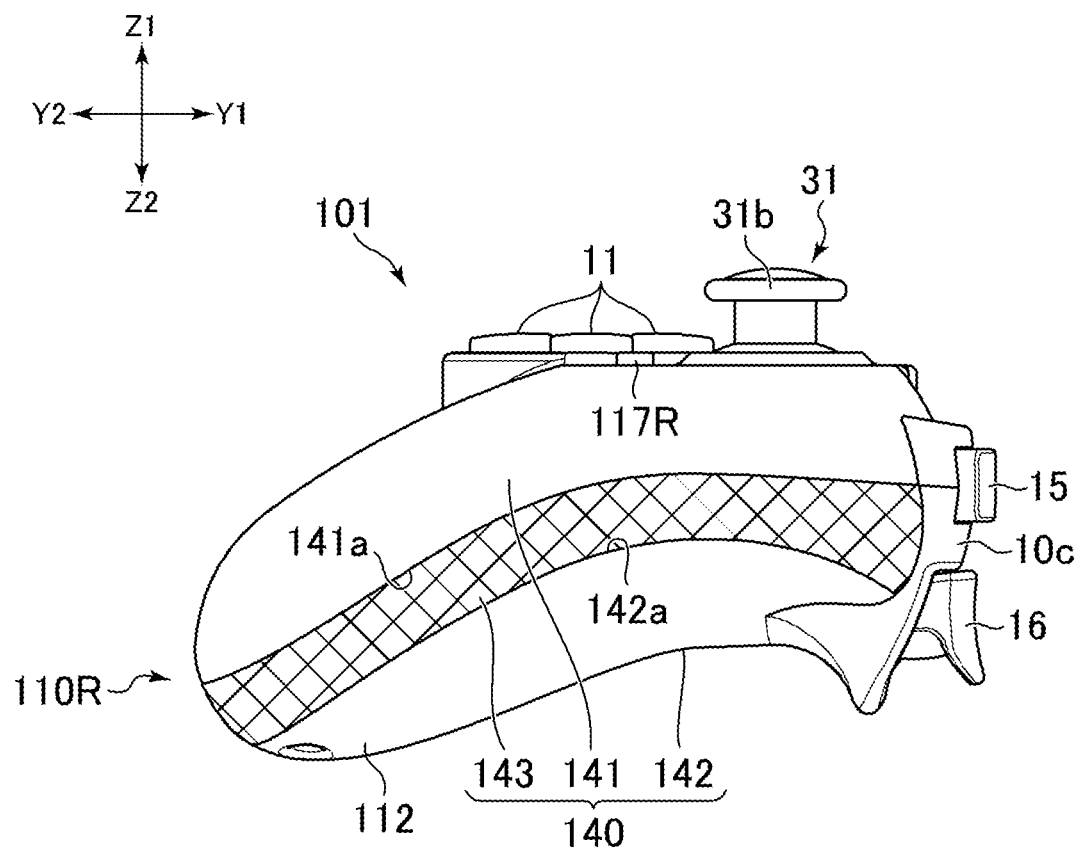
FIG. 15 is a side view of the operating device shown in FIG. 11.
Figure 16:
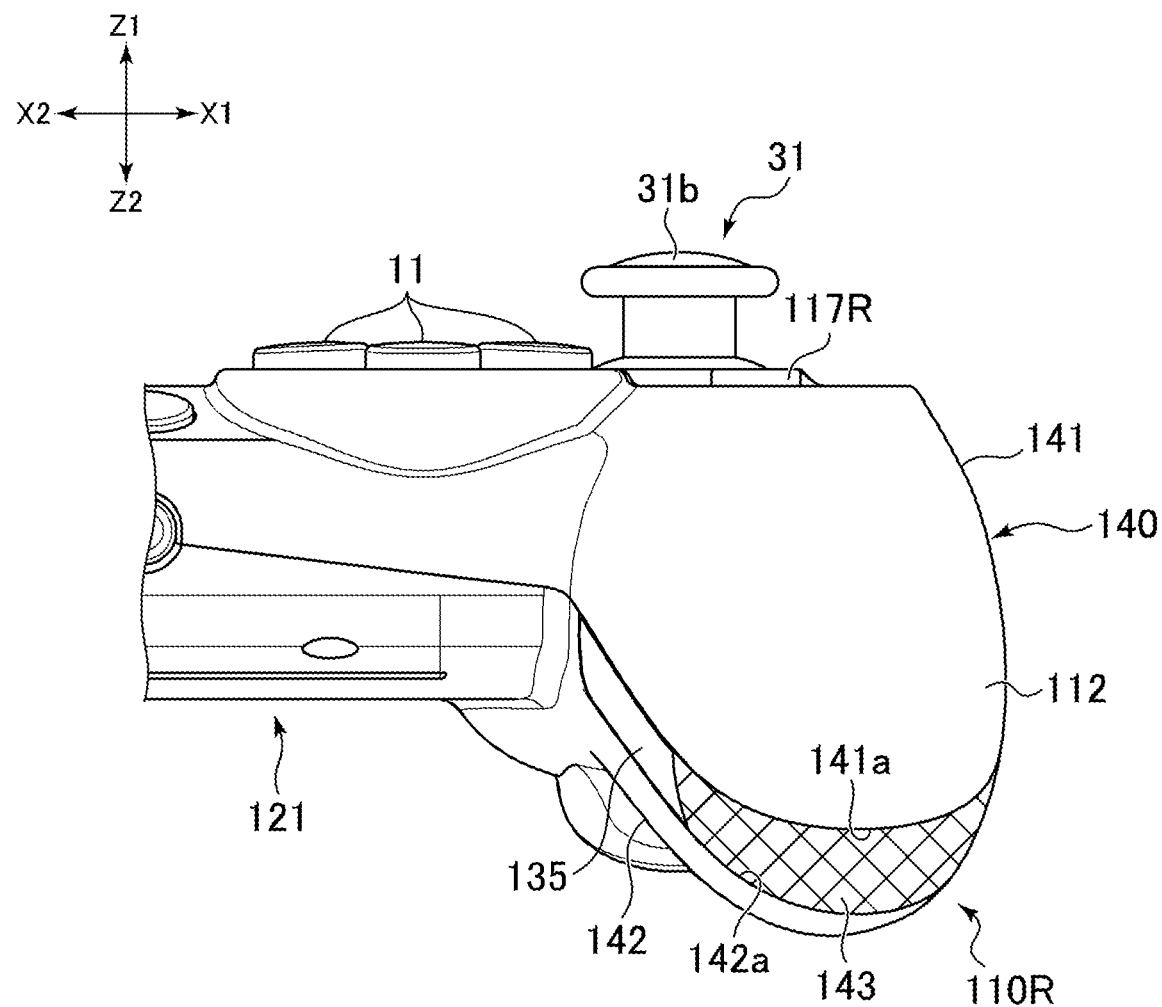
FIG. 16 is an enlarged view showing a back side of the operating device shown in FIG. 11.
Figure 17:
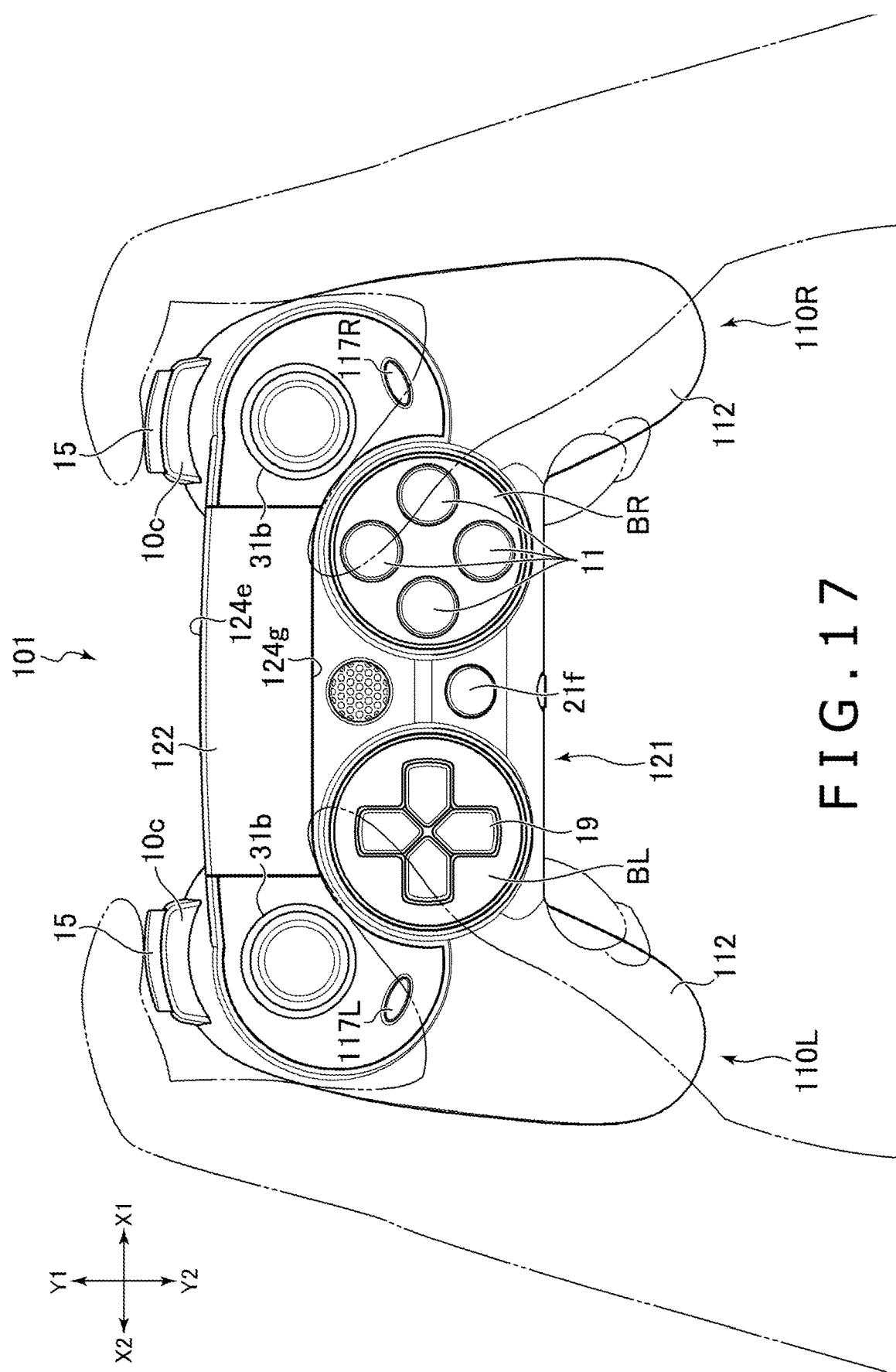
FIG. 17 is a diagram illustrating a mode of use of the operating device shown in FIG. 11.

FIGS. 11 and 12 are perspective views of an operating device 101 as a second example. FIG. 11 is a diagram showing an upper side of the operating device 101, and FIG. 12 is a diagram showing a front side of the operating device 101. FIG. 13 is a plan view of the operating device 101, and FIG. 14 is a front view of the operating device 101. FIG. 15 is a side view of the operating device 101. FIG. 16 is a back elevation of the operating device 101. FIG. 17 is a diagram illustrating a mode of use of the operating device 101. In these drawings, the same parts as those of the operating device 1 above are denoted by the same reference symbols as above. In the following, description will be made mainly of differences from the operating device 1, and items which will not be described are the same as those in the operating device 1.

As shown in FIG. 11, the operating device 101 has hold sections 110L and 110R and a central section 121, like the operating device 1. At upper surfaces of front portions of the hold sections 110L and 110R, operating sticks 31 are provided in place of the operating buttons 11 and the direction key 19. The operating buttons 11 and the direction key 19 are provided at rear portions of an upper surface of the central section 121, and are located on the rear side relative to the operating sticks 31.

As shown in FIG. 13, the operating device 101 has an operating member 122 corresponding to the above-mentioned operating member 22, at the upper surface of the central section 121. The operating member 122 includes a touch sensor 23 and a face panel 124. The face panel 124 in this example is rectangular in shape, like the touch sensor 23, and has a lateral width substantially equal to that of the touch sensor 23. The operating member 122 is located between the operating members possessed by the left and right hold sections 110L and 110R (in this example, between the operating sticks 31). The operating member 122 is so supported as to be capable of vertical movement in response to a user's pressing-down operation, and functions also as a button capable of on-off operations. Like the operating member 22, the operating member 122 is so supported as to be capable of vertical movement when the operating member 122 is pressed, irrespectively of the position of pressing. Incidentally, the structure of the operating member 122 is not restricted to the just-mentioned one; for example, a front edge of the operating member 122 may be supported by a shaft so that only a rear portion of the operating member 122 will be lowered.

The operating member 122 is plate-like in shape, which makes it possible to reduce the distance between a right edge 124a of the operating member 122 and the right-side operating stick 31 as well as the distance between a left edge 124d of the operating member 122 and the left-side operating stick 31. In addition, the distances between the operating member 122 and the operating members disposed on the rear side thereof (specifically, the operating buttons 11 and the direction key 19) can also be reduced. As a result, the user can easily operate the operating member 122 while holding the hold sections 110R and 110L.

As shown in FIG. 13, the central section 121 has at the upper surface of a rear portion thereof operation areas BR and BL in which the operating buttons 11 and the direction key 19 are disposed respectively. The operation areas BR and BL are located on the rear side of the operating member 122. A rightmost portion 124i of a rear edge 124g of the face panel 124 is formed along the outer peripheral edge of the operation area BR. A leftmost portion 124h is formed along the outer peripheral edge of the operation area BL. The rear edge 124g of the face panel 124, or the rear edge of the operating member 122, is close to the outer peripheral edges of the operation areas BR and BL. Therefore, as shown in FIG. 17, the user can easily touch the operating member 122 by obliquely extending a finger disposed on the operation area BR or BL toward the center in the left-right direction of the operating device 101. Thus, since the operating members (the operating buttons 11 and the direction key 19) small in height are disposed on the rear side of the operating member 22, the user can easily touch the rear portion of the operating member 122, particularly. The front edge of the operating member 122 may be supported by a shaft so that only the rear portion of the operating member 122 will be lowered, as above-mentioned.

Like in the case of the operating member 22, a front edge of the operating member 122, or a front edge 124e of the face panel 124, forms a front edge of the upper surface of the central section 121. In other words, as shown in FIG. 12, an upper surface of an upper housing half 141 of the operating device 101 that forms the central section 21 does not have any edge that is located on the further front side of the front edge 124e of the face panel 124. The front edge 124e of the face panel 124 is located at a front surface 121a of the central section 121. A frontmost portion of the face panel 124 in this example is substantially L-shaped in section, like in the case of the face panel 24. Specifically, the face panel 124 has a front surface portion 124f extending downward from the front edge 124e thereof. A front edge of an opening formed in the upper housing half 141 so as to expose the face panel 124 therethrough is located on the lower side of the front surface portion 124f, like in the example shown in FIG. 9.

As shown in FIG. 12, the front surface 121a of the central section 121 has an upper portion 121d which protrudes forward largely, as compared with a lower portion 121e thereof. This enables an increase in the width in the front-rear direction of the upper surface of the central section 121. As a result, the width in the front-rear direction of the operating member 122 can be increased.

At the outer peripheral edges of the operation areas BR and BL are formed steps 121j (see FIGS. 11 and 14), like in the case of the operation areas AR and AL possessed by the operating device 1. The rear edge 124g of the face panel 124 is located on the front side of the steps 121j. Therefore, the user can recognize that a user's finger is located as such a position as to touch the operating member 122, without looking at the operating member 122. Specifically, the user can recognize that a user's finger is disposed at a rear portion of the operating member 122. Surfaces (upper surfaces) of the steps 121j are so inclined as to become lower along the directions toward the outer sides of the operation areas BR and BL. Incidentally, on the inner side of the step 121j of the operation area BR provided with the operating buttons 11, there are provided an annular light guide member 14 and light emitting elements (not shown), like in the case of the operating device 1.

Like the operating device 1, the operating device 101 has a light emitting part 128 at the front surface 121a of the central section 121. The light emitting part 128 is located between the left and right projecting parts 10c formed at front surfaces of the hold sections 110R and 110L (see FIG. 14). The light emitting part 128 in this example is in the shape of a rod extending rectilinearly in the left-right direction, like the light emitting part 28.

A light diffusing member 128a of the light emitting part 128 projects forward, relative to the lower portion 121e of the front surface 121a of the central section 121. More in detail, the upper portion 121d of the front surface 121a of the central section 121 projects forward more largely than the lower portion 121e. As shown in FIG. 12, the light diffusing member 128a forms a lowermost part of the upper portion 121d. Specifically, the upper portion 121d is formed with a recess at the lowermost portion thereof, and the light emitting part 128 is fitted in the recess. The light diffusing member 128a of the light emitting part 128 includes, as its light emitting surface, a lower surface for emitting light downward and a front surface for emitting light forward.

Therefore, the light emitting surface has an enlarged area, and it becomes easy for a camera to catch the light of the light emitting part 128.

The front surface of the light emitting part 128 is flush with the front surface of the upper portion 121d of the central section 121. Therefore, exertion of forces on the light diffusing member 128a from the upper side can be prevented. In addition, since the above-mentioned projecting parts 10c are located on the right side and the left side of the light diffusing member 128a, forces in the left-right direction can be prevented from acting on the light diffusing member 128a.

The connector 33 is provided at the lower portion 121e of the front surface 121a of the central section 121, as shown in FIG. 14. The connector 33 is located on the lower side of the light emitting part 128. Therefore, the upper side of an end portion of a cable connected to the connector 33 can be protected by the light emitting part 128.

As shown in FIGS. 15 and 16, a housing 140 of the operating device 101 has the upper housing half 141 shaped to open downward and a lower housing half 142 shaped to open upward. The housing halves are combined with each other in the vertical direction. The hold sections 110R and 110L and the central section 121 are formed by the housing halves 141 and 142. The hold sections 110R and 110L each have a belt-shaped wall member 143 (in FIGS. 15 and 16, the wall member 143 is crosshatched for clarification). The wall member 143 is disposed between a lower edge 141a of the upper housing half 141 and an upper edge 142a of the lower housing half 142, and forms part of a side surface of the hold section 110R or 110L. In the hold section 110R on the right side, the wall member 143 extends from a right side surface (a surface on the outer side in the left-right direction) of a front portion of the hold section 110R, and extends past a right side surface of a grip 112 and a rear end of the grip 112, to reach a left side surface (a surface on the inner side in the left-right direction) of the grip 112. In the hold section 110L on the left side, the wall member 143 extends from a left side surface (a surface on the outer side in the left-right direction) of a front portion of the hold section 110L, and extends past a left side surface of the grip 112 and the rear end of the grip 112, to reach a right side surface (a surface on the inner side in the left-right direction) of the grip 112. This configuration makes it possible to obviate a situation wherein the edges 141a and 142a of the housing halves 141 and 142 are located at such positions that user's hands holding the hold sections 110R and 110L might easily touch the edges 141a and 142a. Consequently, the feeling obtained when the user is holding the hold sections 110R and 110L can be enhanced.

As shown in FIGS. 11 and 16, operating buttons 135 are provided at the inner-side surfaces of the left and right grips 112. Like the wall members 143, the operating buttons 135 are each located between the lower edge 141a of the upper housing half 141 and the upper edge 142a of the lower housing half 142. In addition, the operating button 135 has a vertical width substantially equal to that of the wall member 143, and is located in the extending direction of the wall member 143 in relation to the wall member 143. This structure ensures that the operating buttons 135 are not conspicuous, so that the external appearance of the operating device 101 can be enhanced. Besides, the operating buttons 135 are flush with the housing halves 141 and 142. This makes it possible to prevent any of fingers gripping the grips 112 from pressing the operating button 135 by mistake.

As shown in FIG. 11, operating buttons 117R and 117L corresponding to the above-mentioned operating buttons 17R and 17L are provided at the hold sections 110R and 110L. The operating buttons 117R and 117L are located on the rear side of the operating members (in this example, the operating sticks 31) provided at front portions of the hold sections 110R and 110L. In addition, the operating buttons 117R and 117L are located on the outer sides in the left-right direction, relative to the operating members (in this example, the operating buttons 11 and the direction key 19) provided at rear portions of the central section 121. As shown in FIG. 13, the operating buttons 117R and 117L are located with a forward offset in relation to the operating buttons 11 and the direction key 19. In other words, the operating buttons 117R and 117L are located on the front side relative to the centers C of the operating buttons 11 and of the direction key 19.

As shown in FIG. 16, the positions of upper surfaces of the operating buttons 11 and an upper surface of the direction key 19 are below the positions of upper surfaces of the operating sticks 31. The positions of upper surfaces of the operating buttons 117R and 117L are further below the positions of the upper surfaces of the operating buttons 11 and the upper surface of the direction key 19. Therefore, the operating buttons 117R and 117L can be prevented from being pressed by mistake during when the operating buttons 11 and/or the direction key 19 is being operated.

As shown in FIG. 11, the hold sections 110R and 110L in this example have slightly recessed recesses 110f in the upper surfaces of front portions thereof. Specifically, arcuate frame parts 110g surrounding the operating sticks 31 are formed in the peripheries of the operating sticks 31. In addition, portions on the inner side of the frame parts 110g are recessed. The operating buttons 117R and 117L are provided in the recesses 110f. Therefore, the height of the operating buttons 117R and 117L, or a projection amount of the operating buttons 117R and 117L from the recesses 110f, can be secured while adopting the structure wherein the positions of the upper surfaces of the operating buttons 117R and 117L are set lower than the positions of the upper surfaces of the operating buttons 11 and the upper surface of the direction key 19.

Third Example of Operating Device

Figure 18:
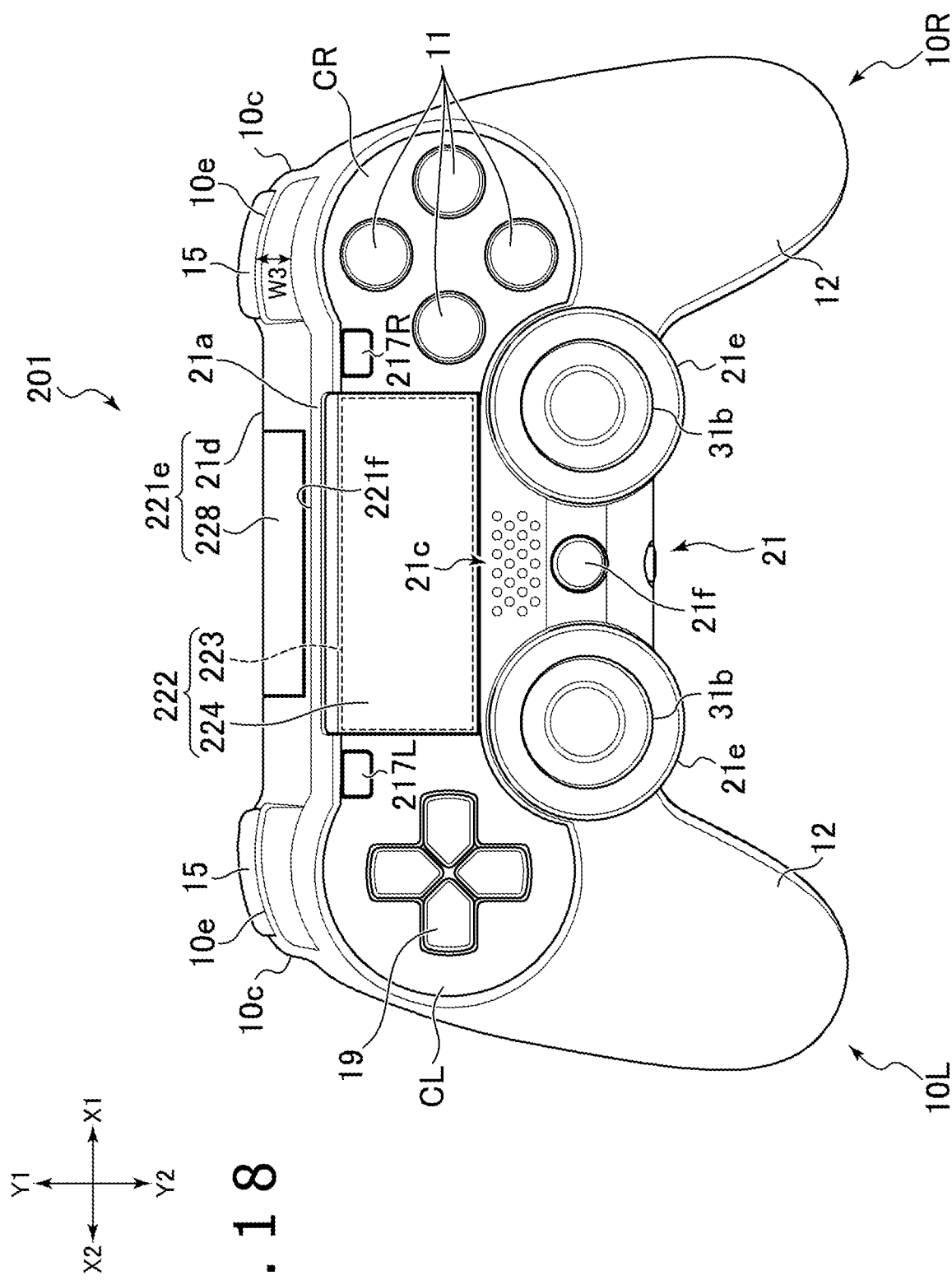
FIG. 18 is a plan view of a third example of an operating device.
Figure 19:
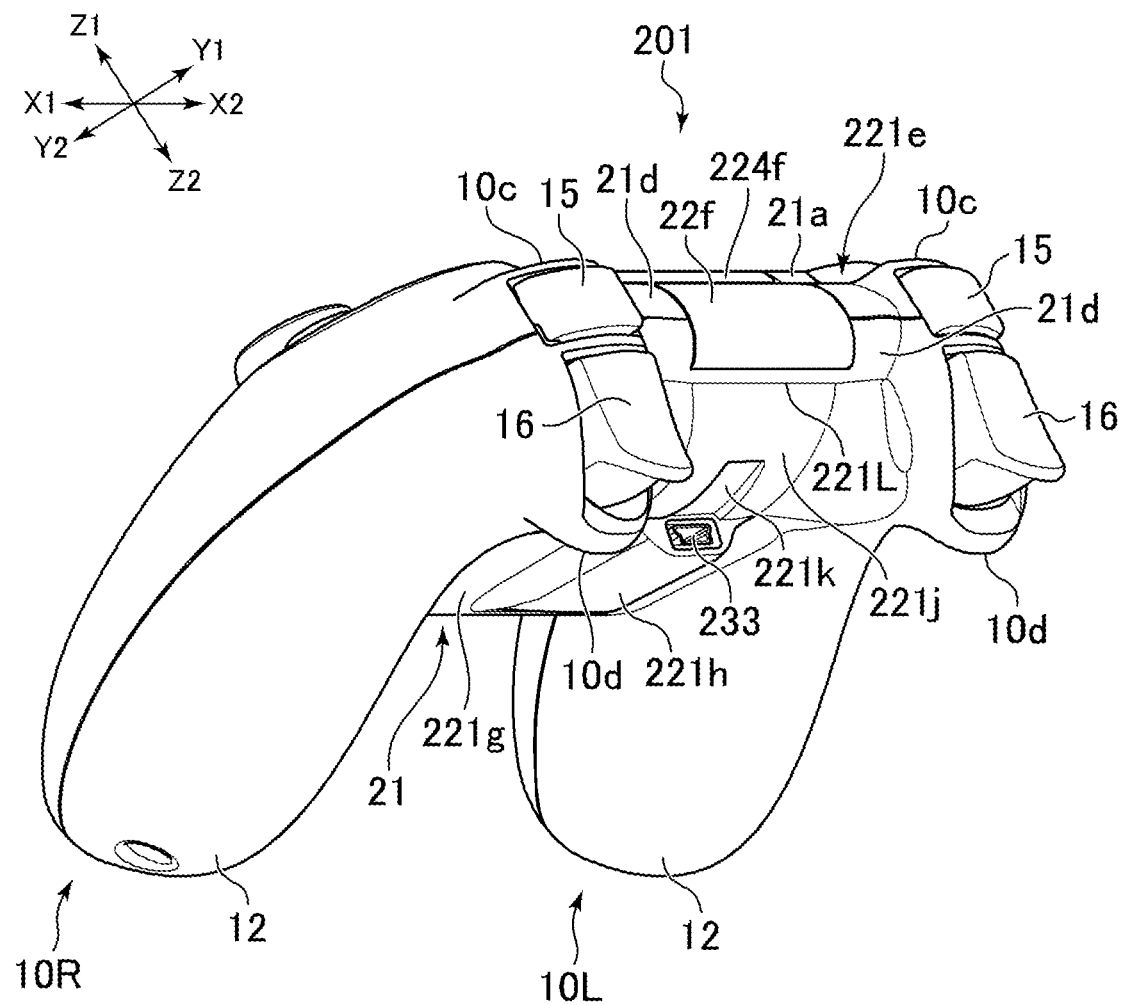
FIG. 19 is a perspective view of the operating device shown in FIG. 18.
Figure 20:
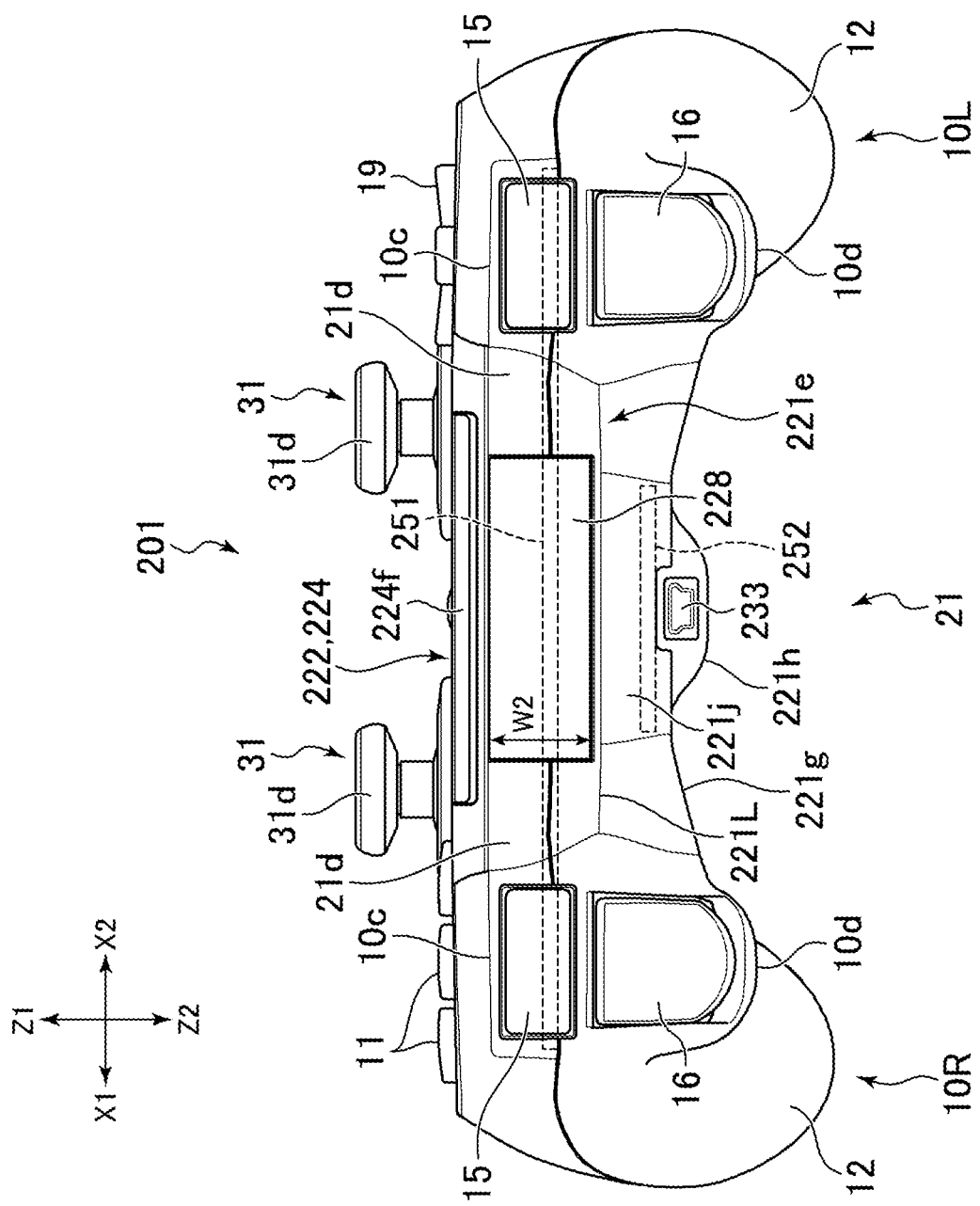
FIG. 20 is a front view of the operating device shown in FIG. 18.
Figure 21:
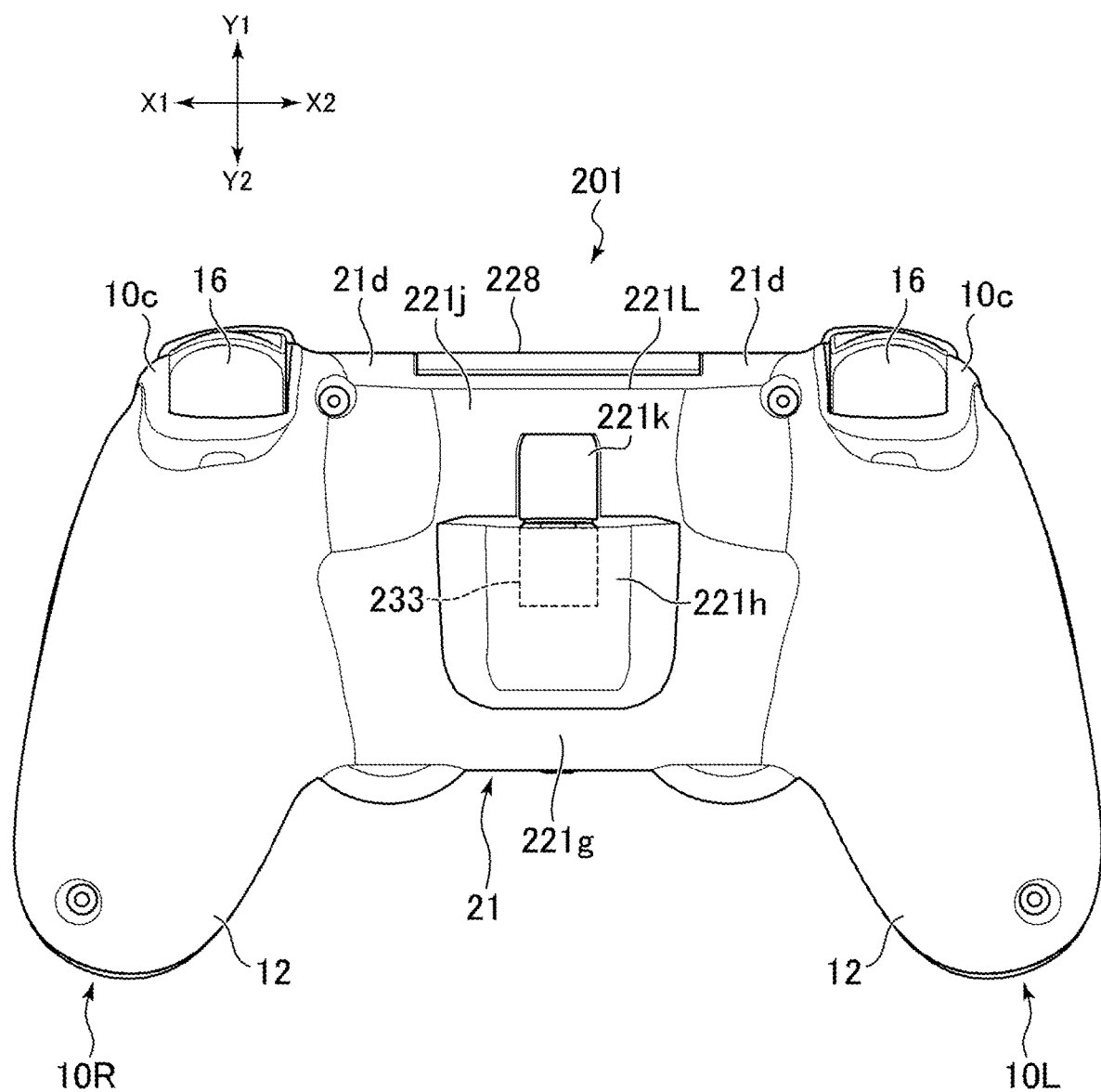
FIG. 21 is a bottom view of the operating device shown in FIG. 18.

FIGS. 18 to 21 are diagrams showing an operating device 101 as a third example. FIG. 18 is a plan view. FIG. 19 is a perspective view. FIG. 20 is a front view. FIG. 21 is a bottom view. In these drawings, the same parts as those of the operating device 1 above are denoted by the same reference symbols as above. In the following, description will be made mainly of differences from the operating device 1, and items which will not be described are the same as those in the operating device 1.

As shown in FIG. 18, the operating device 201 has a plate-shaped operating member 222 at the upper surface of the central section 21. Like the operating member 22, the operating member 222 includes a touch sensor 223 and a face panel 224. The touch sensor 223 is located between the operating members possessed by the left and right hold sections 10L and 10R (namely, between the operating buttons 11 and the direction key 19). The operating member 222 is so supported as to be capable of vertical movement according to a user's pressing-down operation. The face panel 224 in this example is rectangular in shape, and has a lateral width substantially equal to that of the touch sensor 223. In this example, a surface of the face panel 224 and surfaces of operation areas CR and CL, in which the operating buttons 11 and the direction key 19 are respectively disposed, are located on the same plane. In other words, unlike the operating device 1, the operating device 201 does not have any step around the operation areas CR and CL.

As shown in FIG. 19, like the operating member 22, the operating member 222 includes a portion forming the upper surface of the central section 21 and a portion forming the front surface 21a of the central section 21. Specifically, a front edge of the operating member 222 (namely, a front edge of the face panel 224) forms the front edge of the upper surface of the central section 21. A frontmost portion of the face panel 224 in this example is substantially L-shaped in section, and the face panel 224 has a front surface portion 224f extending downward from the front edge thereof.

As shown in FIG. 18, the operating device 201 has, on the right side and the left side of the operating member 222, operating buttons 217R and 217L having the same functions as those of the above-mentioned operating buttons 17R and 17L. The operating buttons 217R and 217L are located between the four operating buttons 11 and the direction key 19, and are located on the front side relative to the four operating buttons 11 and the direction key 19. Therefore, the user can operate the operating button 217R by stretching a finger disposed on one of the operating buttons 11, while holding the hold section 10R. Similarly, the user can operate the operating button 217L by stretching a finger disposed on the direction key 19, while holding the hold section 10L. Upper surfaces of the operating buttons 217R and 217L are not projecting relative to the surface of the face panel 224. The upper surfaces of the operating buttons 217R and 217L in this example are located on the same plane as the surface of the face panel 224. Therefore, the user can be prevented from pressing any of the operating buttons 217R and 217L by mistake, when operating the operating member 22.

As above-mentioned, the hold sections 10R and 10L have the projecting parts 10c at the front surfaces thereof. As shown in FIGS. 19 and 20, the operating device 201 has a light emitting part 228 at the front surface 21a of the central section 21. The light emitting part 228 is located between the left and right projecting parts 10c. The light emitting part 228 is shaped to be elongate in the left-right direction, in front view. Left and right edges of the light emitting part 228 are spaced more from the projecting parts 10c than in the case of the above-described light emitting part 28. Therefore, during when the user is operating the operating buttons 15 and 16 provided at the projecting parts 10c, interception of the light of the light emitting part 228 by a user's finger or fingers can be restrained more effectively.

As shown in FIG. 20, the width in the left-right direction of the light emitting part 228 in this example is smaller than the width in the left-right direction of the operating member 22. A rightmost portion and a leftmost portion of the operating member 22 are located respectively rightwardly of and leftwardly of the light emitting part 228. When the user presses the rightmost portion or the leftmost portion of the operating member 22 while holding the operating device 201 so that the front side of the operating device 201 is set lower, the tip of a user's finger may be stretched beyond the front edge of the operating member 22. Even in such a case, interception of the light of the light emitting part 228 by the user's finger can be restrained, since the width in the left-right direction of the light emitting part 228 is smaller than that of the operating member 22.

Incidentally, as shown in FIG. 19, like the operating device 1, the operating device 201 has the protuberant parts 21d at the front surface 21a of the central section 21. The light emitting part 228 and the protuberant parts 21d form a series of protruding parts 221e extending in the left-right direction. The series of protruding parts 221e is continuous with the left and right projecting parts 10c.

The protruding parts 221e protrude to the more front side than the front edge of the operating member 222 (more specifically, the front surface portion 224f of the face panel 224). A rear edge 228d of the light emitting part 228 is located on the more front side than the front edge of the operating member 222, as shown in FIG. 18. In other words, the front edge of the operating member 222 is located rearwardly of the rear edge 228d of the light emitting part 228. Therefore, even in the case where a user's finger is placed on the front edge of the operating member 222, the user's finger can be prevented from obstructing the acquisition of the light of the light emitting part 228 by a camera. Particularly, in this example, a base portion 221f of the protruding parts 221e is also located forwardly of the front edge of the operating member 222, in plan view of the operating device 201. Therefore, it is possible to more effectively prevent the user's finger from obstructing the acquisition of the light of the light emitting part 228 by the camera. Incidentally, the front edge of the operating member 222 may be so provided as to overlap with the base portion 221f of the protruding parts 221e, in plan view.

As shown in FIG. 20, the light emitting part 228 has a width W2 in the vertical direction which is greater than that of the light emitting part 28. The width W2 of the light emitting part 228 in this example corresponds to the vertical width of the front surface 21a of the central section 21. To be more specific, the width W2 of the light emitting part 228 corresponds to the spacing between a lower edge of the front surface 21a of the central section 21 (namely, a front edge 221L of a lower surface 221g described later) and the front edge of the operating member 22 (in this example, a lower edge of the front surface portion 224f of the face panel 224). In other words, the light emitting part 228 makes the most of the vertical width of the front surface 21a. In this example, the protruding parts 221e have a vertical width corresponding to the vertical width of the front surface 21a of the central section 21; more specifically, the protruding parts 221e have a vertical width substantially equal to the vertical width of the front surface 21a. The light emitting part 228 is provided over the range from an upper edge (base portion 221f) to a lower edge of the protruding parts 221e. Since the light emitting part 228 thus has a comparatively large vertical width, the camera provided for the information processing apparatus can readily capture the light of the light emitting part 228. The light emitting part 228 has at a front surface thereof a light diffusing member having the same function as that of the light diffusing member 28a of the light emitting part 28. Therefore, the whole part of the front surface of the light emitting part 228 emits light.

The light emitting part 228 is provided at the protruding parts 221e, and projects forward from the front surface 21a of the central section 21. As shown in FIG. 18, the projection width of the light emitting part 228 in this example is substantially equal to the projection width W3 of the projecting parts 10c provided at the hold sections 10R and 10L. In other words, the position in the front-rear direction of the front end of the light emitting part 228 is substantially coincident with that of front ends 10e of the projecting parts 10c, in plan view of the operating device 201. Therefore, even in the case where the operating device 201 is held by the user in the state of being inclined to the right side or the left side, the projecting parts 10c can be restrained from intercepting the light of the light emitting part 228. Incidentally, the front surface of the light emitting part 228 is curved in an arcuate shape. In this example, the light emitting part 228 is semicircular in section orthogonal to the extending direction of the light emitting part 228. Therefore, even in the case where the operating device 201 is held in an oblique attitude, a variation in the shape of the light emitting part 228 as recognized by the camera can be restrained.

As shown in FIGS. 19 and 21, the central section 21 of the operating device 201 has the lower surface 221g. The central section 21 is provided at the lower surface 221g with a connector 233 into which a connector of a cable can be inserted from the front side of the operating device 201. In other words, the central section 21 has the connector 233 on the lower side thereof, and an insertion port of the connector 233 into which to insert the cable is opening toward the front side. A front portion 221j of the lower surface 221g projects to the more front side than the insertion port of the connector 233 (the front end of the connector 233). This makes it possible to effectively restrain the light of the light emitting part 228 from being intercepted by the cable connected to the connector 233 or the connector provided at the forward end of the cable. Incidentally, the insertion port of the connector 233 may be oriented obliquely downward. Such a configuration ensures that a larger distance can be secured between the light emitting part 228 and the cable connected to the connector 233.

As shown in FIG. 19, the lower surface 221g of the central section 21 has a bulging part 221h which bulges downward. The connector 233 is accommodated in the bulging part 221h, and its insertion port is exposed to the front side from a front surface of the bulging part 221h. As shown in FIG. 20, lowermost portions (in this example, the lower ends of rearmost portions) of the hold sections 10R and 10L and the lower ends 10d of the projecting parts 10c are located below the bulging part 221h. Therefore, even when the user places the operating device 201 on a flat surface for storage of the operating device 201, the connector provided at the end portion of the cable is prevented from touching the flat surface. As a result, exertion of a load on the connector 233 can be prevented.

As shown in FIG. 19, the front portion 221j of the lower surface 221g is formed obliquely, and extends forward and upward. Therefore, when the user inserts the connector of the cable into the connector 233, the connector of the cable can be guided into the connector 233 by the front portion 221j. As a result, the connector of the cable can be inserted smoothly. The front portion 221j in this example is curved gently. Incidentally, the front portion 221j may be an inclined flat surface. The front portion 221j is formed with a groove 221k having a width corresponding to the width of the connector of the cable. In the condition where the connector of the cable is inserted in the connector 233, the end portion of the cable is disposed in the groove 221k. Therefore, even in the case where the operating device 201 is moved in use of the operating device 201, leftward and rightward loads exerted on the connector 233 can be moderated.

As shown in FIG. 20, the light emitting part 228 and the connector 233 are located to be spaced from each other in the vertical direction, in front view. The operating device 201 incorporates a circuit board therein. One of a light source (e.g., LED) of the light emitting part 228 and the connector 233 is mounted on the circuit board, while the other is vertically spaced from the circuit board. In addition, the other is connected to the circuit board through a cable or the like.

In the example shown in FIG. 20, the light source of the light emitting part 228 is mounted on a circuit board 251. The operating device 201 in this example further has a circuit board 252 which is disposed on the lower side of the circuit board 251 and which is opposed to the circuit board 251. The connector 233 is mounted on the circuit board 252. The circuit board 251 and the circuit board 252 are interconnected through wiring (not shown). A control circuit for controlling the operating device 201 is mounted on the circuit board 251, and data emitted and received through the connector 233 is inputted into the control circuit on the circuit board 251 through the circuit board 252 and the wiring.

The connector 233 is mounted on a lower surface of the circuit board 252. On the other hand, the light source of the light emitting part 228 is mounted, for example, on an upper surface of the circuit board 251. This ensures that a large distance in the vertical direction can be secured between the connector 233 and the light emitting part 228. As a result, the cable connected to the connector 233 can be effectively restrained from blocking the light from the light emitting part 228. Incidentally, the circuit board 252 may not necessarily be provided. For instance, the connector 233 may be connected to the circuit board 251 through wiring, without any other circuit board therebetween.

As has been described above, the operating device 201 includes the left and right hold sections 10R and 10L to be held by the user, which have the upper surfaces provided with the first operating members (in the above description, the operating buttons 11 and the direction key 19) and which are located to be spaced from each other in the left-right direction. In addition, the operating device 201 includes: the central section 21 interconnecting the left and right hold sections 10R and 10L; the light emitting part 228 provided at the front surface 21a of the central section 21; the connector 233 which is provided at the lower surface 221g of the central section 21 and into which the cable can be inserted from the front side; and the lower surface 221g of the central section 21 which is possessed by the front portion of the central section 21 and which projects to the more front side than the connector 233. According to this operating device 201, the cable connected to the connector 233 can be restrained from obstructing the propagation of the light from the light emitting part 228.

It is to be noted that various modifications are possible to the operating device.

For instance, the operating buttons 135 at the grips 12 and 112 may not necessarily be provided in the operating device.

In addition, the positions of the operating buttons 17R and 17L may not necessarily be on the rear side of the operating members (the operating buttons 11 and the direction key 19) provided at the front portions of the hold sections 10R and 10L. The operating buttons 17R and 17L may be disposed, for example, between the left and right operating sticks 31.

Besides, the light emitting part 28 provided at the front surface of the central section 21 may not necessarily project to the front side.

In addition, in the operating device 101, the upper portion 121d of the front surface 121a of the central section 121 may not project to the front side relative to the lower portion 121e.

Besides, the upper surface of the housing as part of the operating device 1, 101 or 201 may have an edge located on the front side of the operating member 22, 122 or 222.

In addition, a plurality of light emitting parts may be provided at the front surface 21a of the central section 21.

In that case, the plurality of light emitting parts may be disposed to be aligned in the left-right direction.

Embodiment of Present Invention

Figure 22:
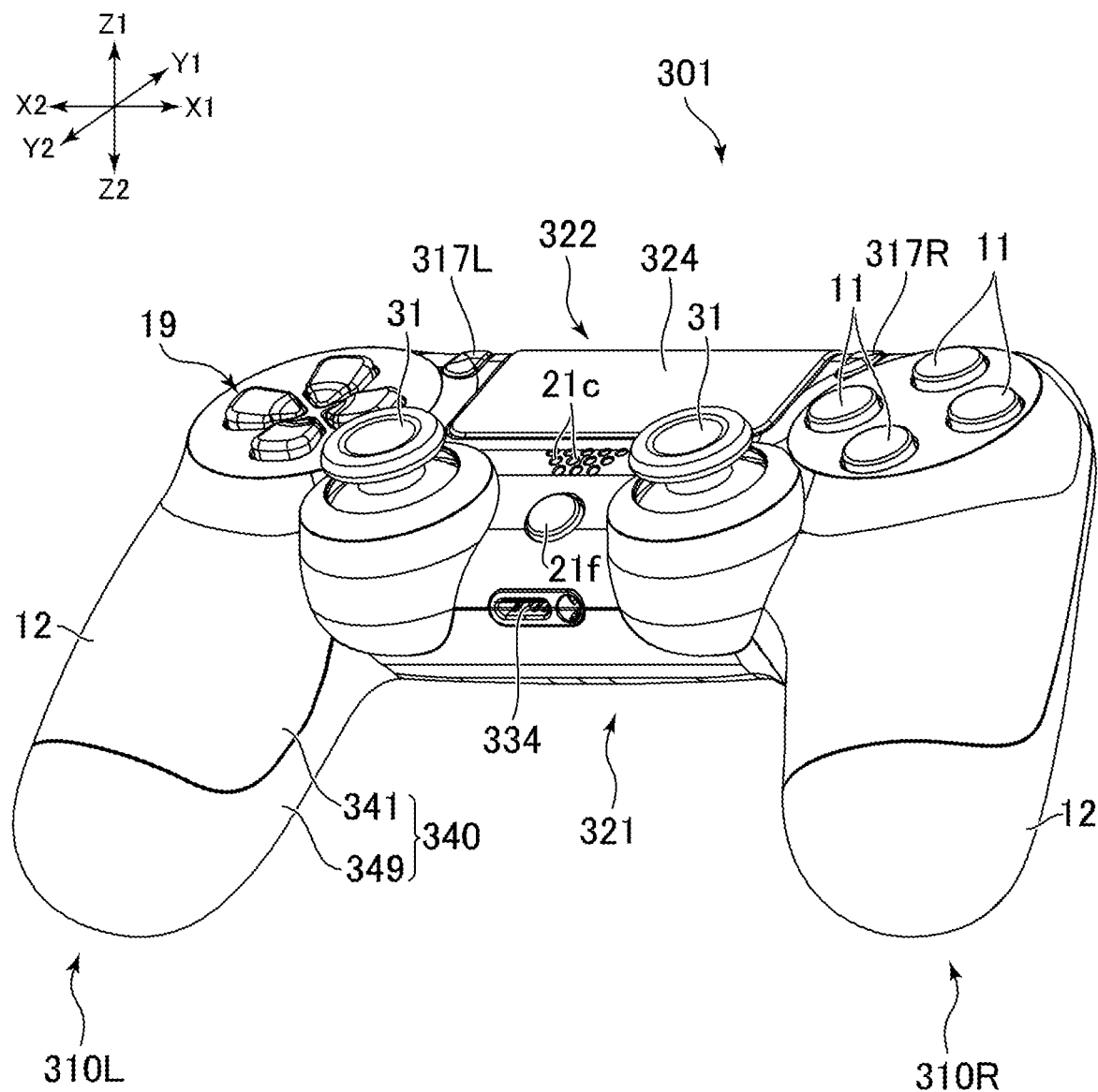
FIG. 22 is a perspective view of an operating device according to an embodiment of the present invention, and an upper side of the operating device is shown in this figure.
Figure 23:
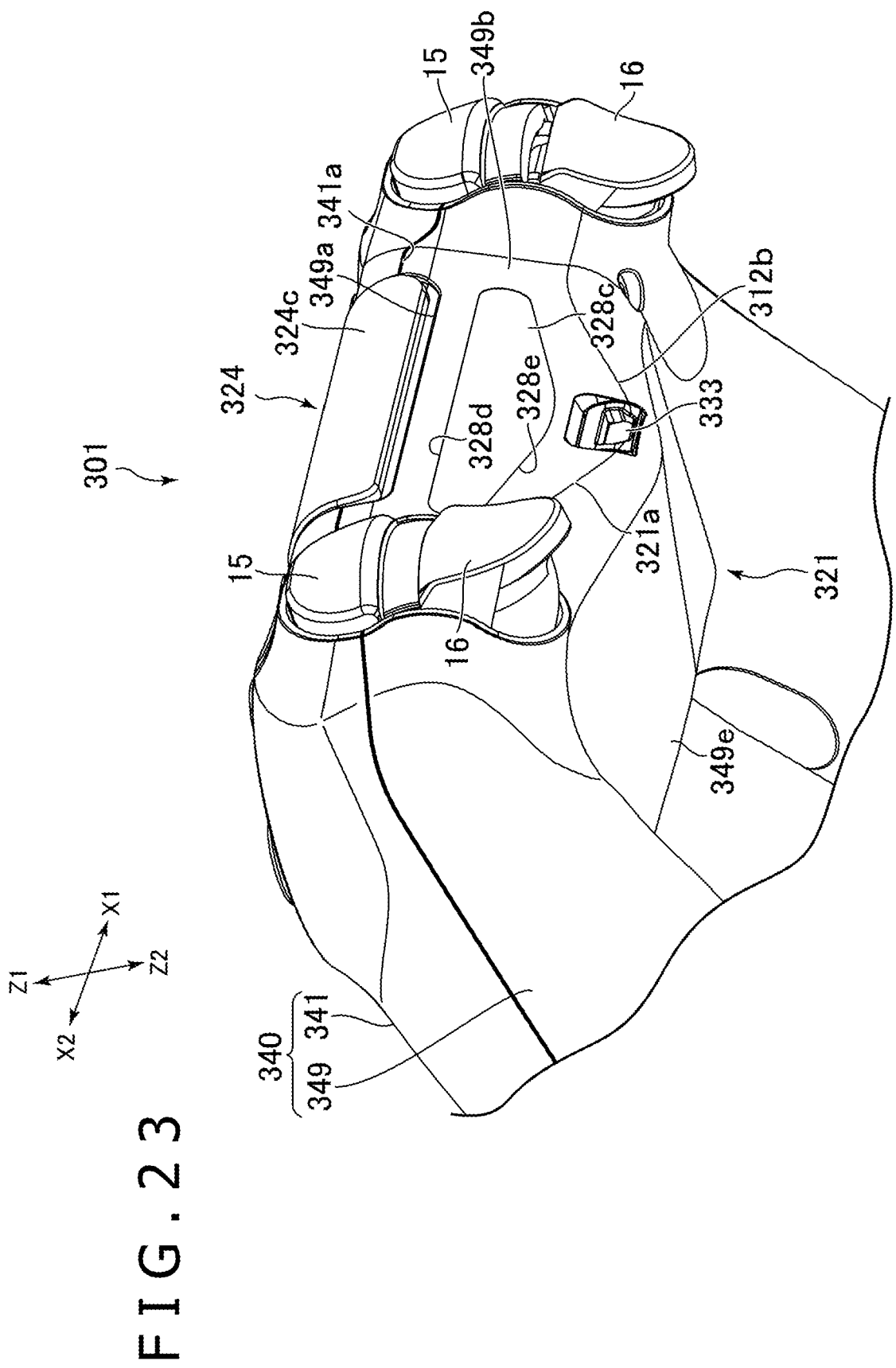
FIG. 23 is a perspective view of the operating device shown in FIG. 22, and a front side of the operating device is shown in this figure.
Figure 24:
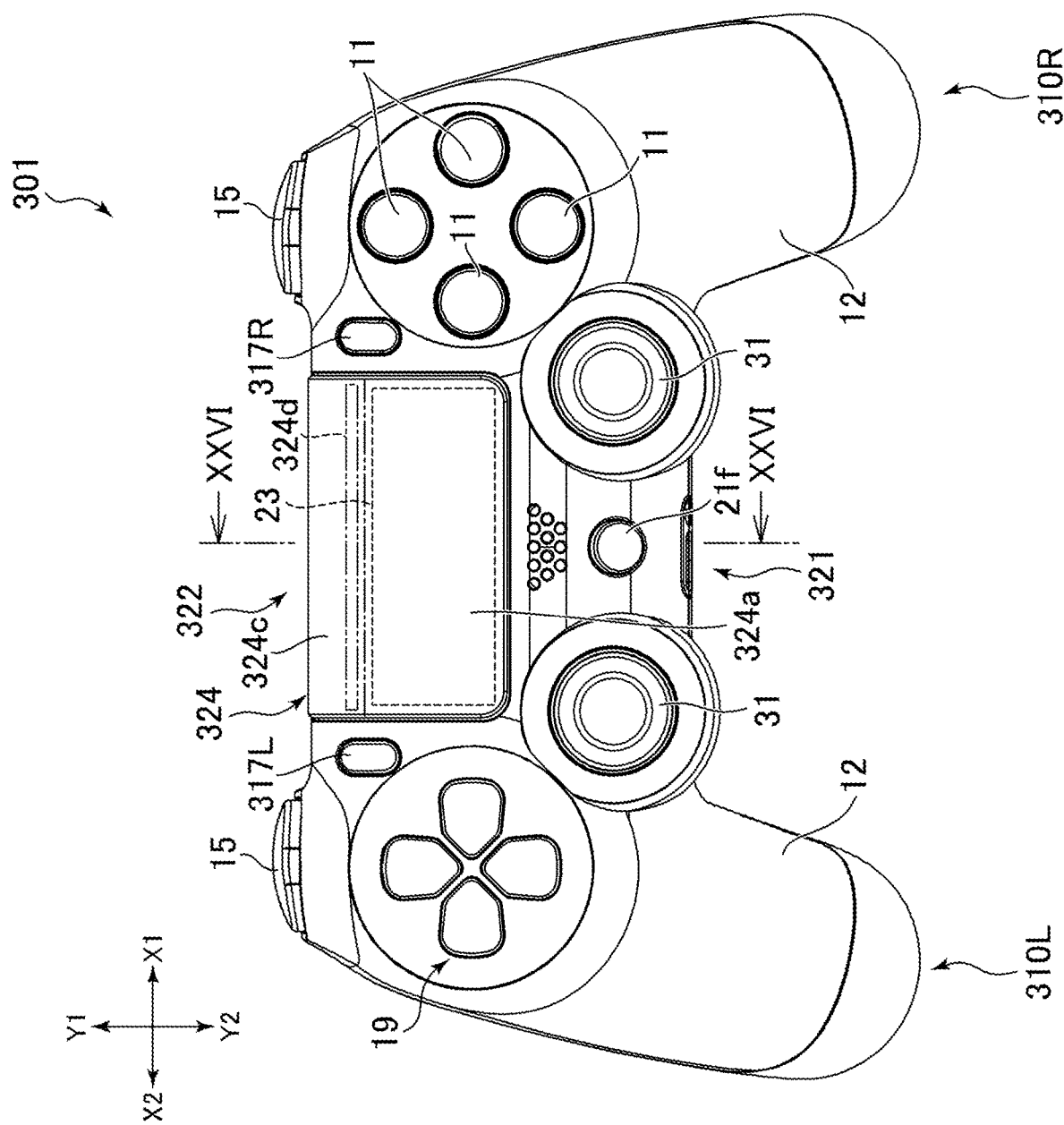
FIG. 24 is a plan view of the operating device shown in FIG. 22.
Figure 25:
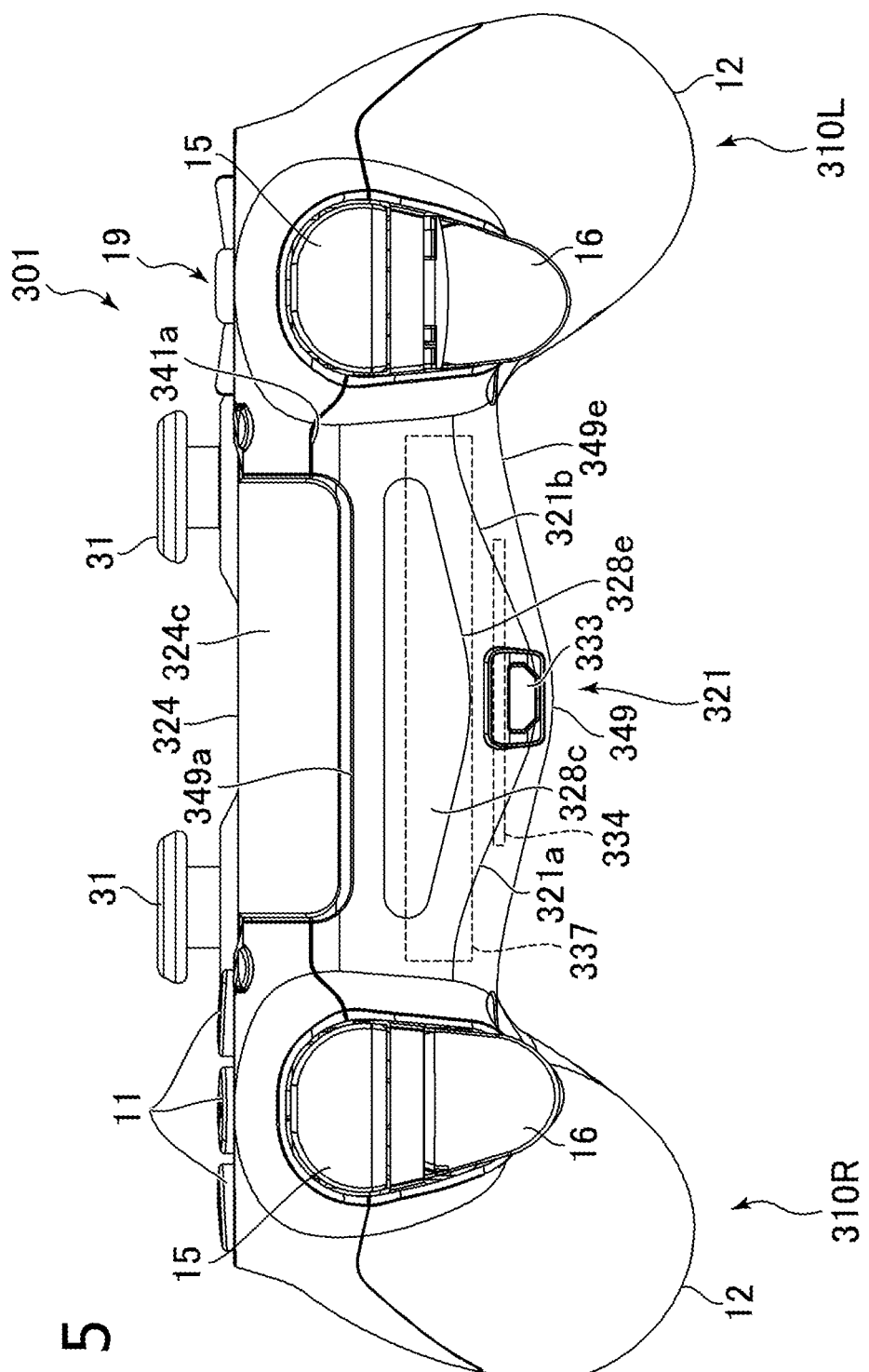
FIG. 25 is a front view of the operating device shown in FIG. 22.
Figure 26:
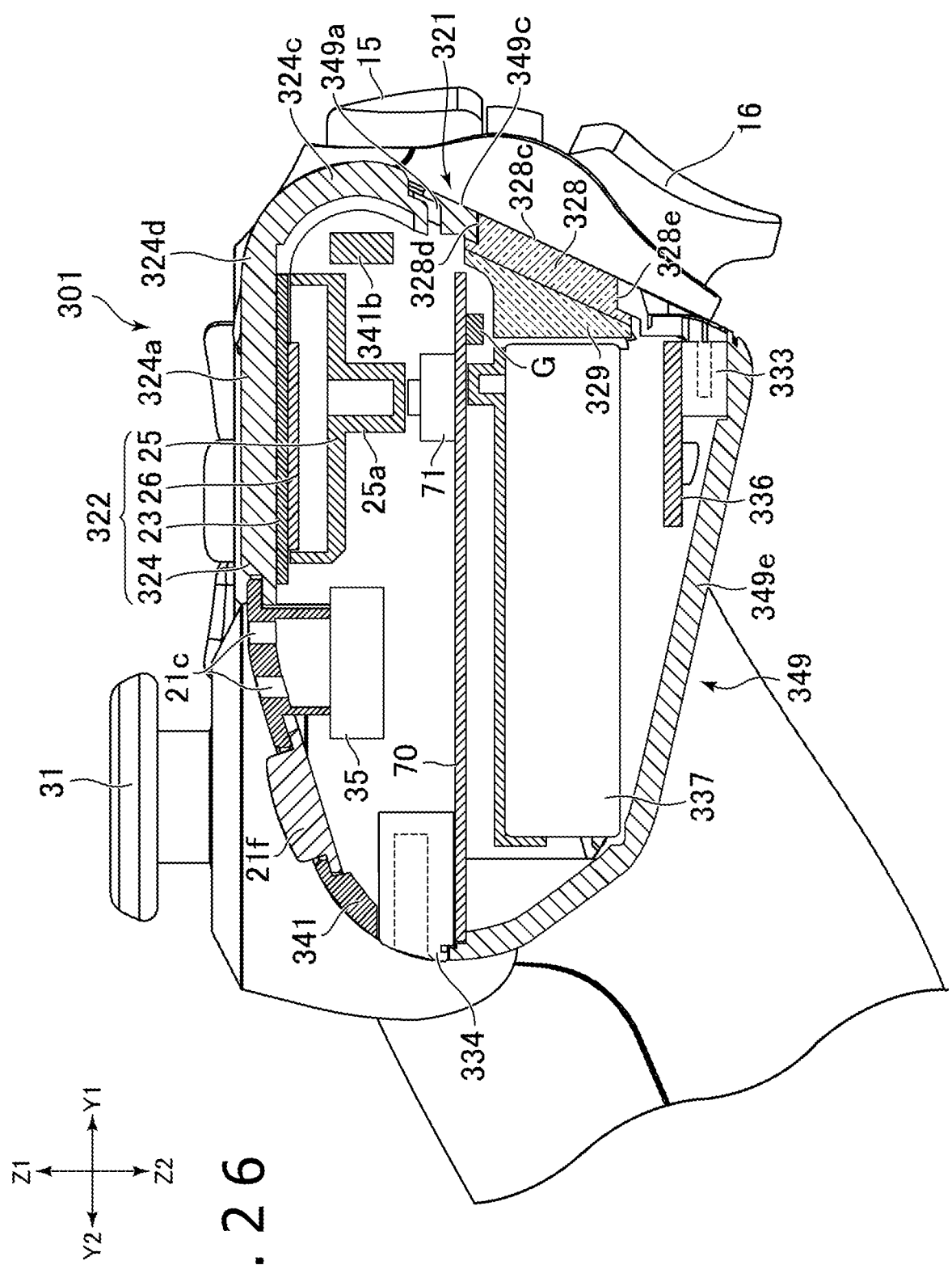
FIG. 26 is a sectional view taken along line XXVI-XXVI of FIG. 24.

An embodiment of the present invention will be described below, referring to the drawings. FIGS. 22 and 23 are perspective views of an operating device 301 which is one example of the embodiment of the present invention. FIG. 22 is a diagram of the operating device 301 on an upper side, and FIG. 23 is a diagram of the operating device 301 on a front side. FIG. 24 is a plan view of the operating device 301, and FIG. 25 is a front view of the operating device 301. FIG. 26 is a sectional view taken along line XXVI-XXVI of FIG. 24. In these figures, the same parts as those in the operating devices described above are denoted by the same reference symbols as used above. In the following, description will be made principally of the points in which the operating device 301 differs from the aforementioned operating devices. The other points which will not be described below are the same as in the above-described operating devices.

As depicted in FIG. 22, the operating device 301 has at a left portion and a right portion thereof hold sections 310L and 310R to be held by a user. In addition, the operating device 301 has a central section 321 between the hold sections 310L and 310R. At upper surfaces of front portions of the hold sections 310L and 310R, there are provided operating members (specifically, operating buttons 11 and direction keys 19) to be operated by the user. The operating device 301 has a housing 340. The housing 340 constitutes an outer surface of the operating device 301, and houses therein a variety of component parts possessed by the operating device 301. The housing 340 in this example has an upper housing half 341 and a lower housing half 349, which are put into combination with each other in the vertical direction.

As shown in FIG. 23, the operating device 301 has a light emitting surface 328c at a front surface of the central section 321. Light from the light emitting surface 328c is captured through a camera connected to an information processing apparatus. As illustrated in FIG. 26, the operating device 301 has light sources G (in this example, light emitting diodes) which emit visible rays, and a plate-shaped light diffusing member 328 having a front surface functioning as the light emitting surface 328c. Light from the light sources G passes through the light diffusing member 328, to be emitted from the whole part of the light emitting surface 328c. In other words, the light emitting surface 328c performs surface light emission.

The operating device 301 includes a plurality of different-color light sources G (for example, red, green and blue light sources). The operating device 301 controls the brightness of each of the light sources G, whereby the light emitting surface 328c is made to emit light in a color designated by the information processing apparatus or a color according to operating conditions of the operating device 301. This ensures that even where a plurality of the operating devices 301 are used simultaneously, the information processing apparatus can detect the respective positions of the operating devices 301.

In the example illustrated in FIG. 26, a light guide member 329 is disposed on an inner side of the light diffusing member 328. The light sources G are mounted on a lower surface of a circuit board 70, and are located on an upper side of the light guide member 329. The lights from the light sources G are diffused in the light guide member 329 and the light diffusing member 328, before being emitted from the light emitting surface 328c. The positions of the light sources G are not restricted to the just-mentioned. For instance, the light sources G may be disposed at the left and the right of the members 328 and 329.

The central section 321 includes a portion located over the light emitting surface 328c. The light emitting surface 328c is so disposed as to be hidden behind this portion of the central section 321. As depicted in FIG. 26, the operating device 301 also has a face panel 324 constituting an upper surface of the central section 321, like the operating device 1, etc. which have been described hereinabove. The light emitting surface 328c is located under the face panel 324, and is so disposed as to be oriented obliquely forward and downward. This layout of the light emitting surface 328c ensures that the light emitting surface 328c is hidden behind the face panel 324 as the central section 321 is viewed from above. To be more specific, when the central section 321 is viewed obliquely from an upper front side, the light emitting surface 328c is hidden behind the face panel 324. Therefore, light from lighting equipment in a room in which the operating device 301 is being used or the like can be restrained from being incident on, and reflected by, the light emitting surface 328c. It is to be noted that the member located over the light emitting surface 328c may not necessarily be the face panel 324. For instance, the upper housing half 341 may be formed with a portion which is located over the light emitting surface 328c.

The central section 321 has a portion which is located over the light emitting surface 328c and is located on a more forward side than the light emitting surface 328c. As shown in FIG. 26, this portion includes a front portion of the face panel 324 (hereinafter referred to as front surface portion 324c). The front portion 324c protrudes to a more forward side than an upper edge 328d of the light emitting surface 328c. This ensures more effective prevention of the light from the room lighting equipment from being incident on the light emitting surface 328c. Note that the front surface portion 324c of the face panel 324 may not necessarily protrude to the more forward side than the upper edge 328d of the light emitting surface 328c. For example, the front surface portion 324c may have a flat plate-like shape extending upward from the position of the upper edge 328d of the light emitting surface 328c.

As shown in FIG. 26, the light emitting surface 328c in this example is a flat surface oriented obliquely downward. Specifically, the light emitting surface 328c is inclined so that the upper edge 328d thereof is located on a more forward side than a lower edge 328e thereof. This shape of the light emitting surface 328c ensures that the light emitting surface 328c is more likely to be hidden behind the face panel 324 than in the case of a structure in which the light emitting surface is so bent as to be protuberant to the forward side. In addition, when the operating device 301 is held in a somewhat upwardly inclined state by the user, the light emitting surface 328c can be oriented toward a camera.

A lower-side portion of the front surface of the central section 321 is oriented obliquely downward. As depicted in FIG. 23, the light emitting surface 328c is provided in a common plane in which the front surface of the central section 321 also lies. In other words, the light emitting surface 328c and the part surrounding the periphery of the light emitting surface 328c are located in substantially the same plane. In this example, a front surface 349b of the housing 340 (more specifically, the lower housing half 349) is an inclined surface which is oriented obliquely downward. The front surface 349b includes a surface 349c which extends obliquely toward an upper front side from the upper edge of the light emitting surface 328c. This surface 349c is located on a more forward side than the light emitting surface 328c, together with the front portion 324c of the face panel 324. The front surface of the housing 340 is formed with an opening for exposing the light emitting surface 328c, and the light emitting surface 328c is flush with an edge of the opening of the housing 340. It is to be noted that the light emitting surface 328c may be recessed in relation to the part surrounding the light emitting surface 328c.

As shown in FIG. 26, at the front surface of the central section 321 is provided a connector 333, which is located under the light emitting surface 328c. Even when a terminal of a cable comes into contact with the light emitting surface 328c by mistake in a process of fitting the cable terminal into the connector 333, the cable terminal can be guided to the connector 333 by the light emitting surface 328c, which is formed flush with the surrounding part. In addition, it is possible to lower the possibility that an external force might be exerted, from above, on the cable terminal fitted into the connector 333.

As illustrated in FIG. 23, each of the left and right hold sections 310L and 310R is provided with operating buttons 15 and 16 at a front surface thereof. The operating buttons 15 and 16 protrude to a more forward side than the front surface of the central section 321. As aforementioned, the light emitting surface 328c is formed to be oriented obliquely downward, and its lower edge 328e is located on a more rear side than its upper edge 328d. The connector 333 is provided under the lower edge 328e of the light emitting surface 328c.

Particularly in this example, the connector 333 is located on a more rear side than the lower edge 328e of the light emitting surface 328c (see FIG. 26). This structure ensured that a larger spacing is secured between the operating buttons 15 and 16 and the connector 33, than in the case of a structure wherein the light emitting surface 328c is disposed to be oriented straight forward. As a result, when the user's fingers are placed on the operating buttons 15 and 16, the possibility of any of the fingers coming into contact with a cable portion near the terminal can be lowered, so that exertion of a load on the connector 333 can be prevented.

As shown in FIG. 25, the light emitting surface 328c is shaped to be elongated in the left-right direction. The light emitting surface 328c in this example is roughly triangular in shape. This shape permits the information processing apparatus to easily distinguish the light emitted from the light emitting surface 328c from other light. As a result, the accuracy in detecting the position of the operating device 301 can be enhanced. Note that the light emitting surface 328c may be polygonal in shape.

As illustrated in FIG. 25, the light emitting surface 328c has a shape corresponding to the front surface of the central section 321. The front surface of the central section 321 in this example has a lower edge which is bent at a midpoint thereof. Specifically, the lower edge of the front surface has a portion 321a extending obliquely rightward and upward from the midpoint, and a portion 321b extending leftward and upward from the midpoint. The lower edge 328e of the light emitting surface 328c, also, has a portion extending obliquely rightward and upward from a midpoint, and a portion extending leftward and upward from the midpoint, like the lower edge of the front surface of the central section 321. This makes it easy to secure the size of the light emitting surface 328c.

As depicted in FIG. 24, the operating device 301 has a plate-shaped operating member 322 at an upper surface of the central section 321, like the operating devices in the first to third examples described hereinabove. The operating member 322 includes a touch sensor 23 (see FIG. 26) and the face panel 324. The touch sensor 23 is located between the operating members possessed by the left and right hold sections 310L and 310R (namely, the operating buttons 11 and the direction keys 19). Beneath the operating member 322 is disposed a switch 71 (see FIG. 26) for detecting that the operating member 322 is depressed. Therefore, the operating member 322 functions as a button capable of on-off operations. As shown in FIG. 22, the operating device 301 has, on the right side and the left side of the operating member 322, operating buttons 317R and 317L which correspond to the aforementioned operating buttons 217R and 217L.

The face panel 324 in this example is slightly protruding upward, relative to the part surrounding a rear edge, a left edge and a right edge of the face panel 324 (namely, relative to the edge of the opening formed in the housing 340). Therefore, a step is formed along the periphery of the face panel 324. This permits the user to recognize the position of the operating member 322 with his/her fingers disposed on the central section 321, without looking at the operating device 301.

On the lower side of the operating member 322 are arranged a plurality of elastic members (e.g., springs or rubber), like in the example shown in FIG. 10. The operating member 322 is so supported by these elastic members that it can be moved vertically when the operating member 322 is depressed, no matter where the point of depression is located. As shown in FIG. 26, under the operating member 322 is disposed the circuit board 70 on which the switch 71 is mounted. The operating member 322 has, in a central area of the lower surface thereof, a pressing part 25a for depressing the switch 71. The operating member 322 in this example has a frame 25 at the lower surface thereof, and the pressing part 25a is formed as part of the frame 25. Note that the frame 25 is roughly box-like in shape, and a driving circuit 26 for the touch sensor 23 is disposed inside the frame 25.

As depicted in FIG. 26, the operating member 322 (specifically, the face panel 324) includes a portion constituting the upper surface of the central section 321 (this portion will hereinafter be referred to as upper surface portion 324a), and a portion constituting the front surface of the central section 321 (front surface portion 324c), like the aforementioned operating member 22, etc. This structure permits the user to smoothly slide forward his/her fingers on the face panel 324. In addition, the user can easily depress a frontmost part of the upper surface portion 324a of the face panel 324. Furthermore, the rigidity of the front portion of the face panel 324 can be increased by the front surface portion 324c.

As shown in FIG. 26, the touch sensor 23 is mounted to the upper surface portion 324a of the face panel 324. The front surface portion 324c extends beyond a front edge of the touch sensor 23, and extends downward while bending. The front surface portion 324c in this example has an arcuate cross-section. The housing 340 is formed with an opening through which the face panel 324 is exposed. A front edge 349a of the opening in the housing 340 is located under the lower edge of the front surface portion 324c.

In this example, as depicted in FIG. 25, the front surface portion 324c of the face panel 324 extends downward beyond a lower edge 341a of the front surface of the upper housing half 341, and the front edge 349a of the opening is provided at an upper edge of the lower housing half 349.

This structure of the housing halves 341, 349 enables the vertical width of the front surface portion 324c to be enlarged.

As illustrated in FIG. 26, the upper housing half 341 has, at a front portion thereof, a beam part 341b which is located on an inner side of the front surface portion 324c of the face panel 324 and extends in the left-right direction. With this beam part 341b, it is possible to compensate for a lowering in the rigidity of the upper housing half 341 due to the upper housing half 341 lacking a portion located under the front surface portion 324c.

The central section 321 is so configured that the light from the light sources G leaks through the upper surface of the central section 321. Specifically, the face panel 324 is formed of a light transmitting material. The face panel 324 has a portion ranging beyond the front edge of the touch sensor 23. Under the portion ranging beyond the front edge of the touch sensor 23, there are arranged the light sources G, a member or members for reflecting the light of the light sources G, and a member or members which emit light upon receiving the light of the light sources G. This ensures that light leaks through the part ranging beyond the front edge of the touch sensor 23. In the example illustrated in FIGS. 24 and 26, the upper surface portion 324a of the face panel 324 has a portion 324d which extends forward slightly beyond the front edge of the touch sensor 23. The front surface portion 324c extends downward from the portion 324d, while bending. The light diffusing member 328 and the light guide member 329 are located under the portion 324d and the front surface portion 324c. Therefore, the light outgoing upward from the light diffusing member 328 passes through the portion 324d, to leak upward. It is to be noted that the light sources G may be disposed under the portion 324d of the face panel 324. An upper surface or a lower surface of the face panel 324 may be given a coloring for defining the position of leakage of light.

By observing the light outgoing via the portion 324d, the user can recognize the color of the light of the light sources G. This is particularly effective when a plurality of the operating devices 301 are used simultaneously. Thus, in one example of processing by the information processing apparatus, the operating devices 301 are discriminated by the colors of the light emitting surfaces 328c, and an object corresponding to each operating device 301 is displayed. The user can recognize the object being moved through the operating device 301, based on the light leaking through the upper surface of the central section 321.

As shown in FIG. 23, a bottom portion 349e of the housing 340 (specifically, the lower housing half 349) is protuberant to the lower side in its center in the left-right direction. In other words, the bottom portion 349e has on the right side thereof an inclined surface oriented obliquely rightward and downward, and has on the left side thereof an inclined surface oriented obliquely leftward and downward. By virtue of this shape of the bottom portion 349e, an increase in the rigidity of the bottom portion 349e is achieved.

As depicted in FIG. 25, inside the lower housing half 349 are arranged the connector 333, a circuit board 336 to a lower surface of which the connector 333 is mounted, and a battery 337. The connector 333 is disposed at a lowermost portion of the lower housing half 349; besides, the connector 333, the circuit board 336, and the battery 337 are arranged in this order from the lower side. In addition, the widths of these three component parts in the left-right direction are so set as to be greater on the upper side. By virtue of this design, prevention of a needless space from being generated inside the bottom portion 349e is achieved.

As shown in FIG. 22, a connector 334 is provided at a back surface of the central section 321. To the connector 34 is connected a cable of a headphone, an earphone or the like, for example. In addition, other device for expanding the function of the operating device 1 may be connected to the connector 34.

The present invention is not limited to the above-described embodiment, and various modifications are possible.

For instance, the light emitting surface 328c may be oriented straight forward. In this case, a frontmost portion of the face panel 324 may have an eaves-like shape such as to project forward from the light emitting surface 328c.

In addition, the edge 349a of the housing 340 located under the face panel 324 may be formed as part of the upper housing half 341.

Figure 27:
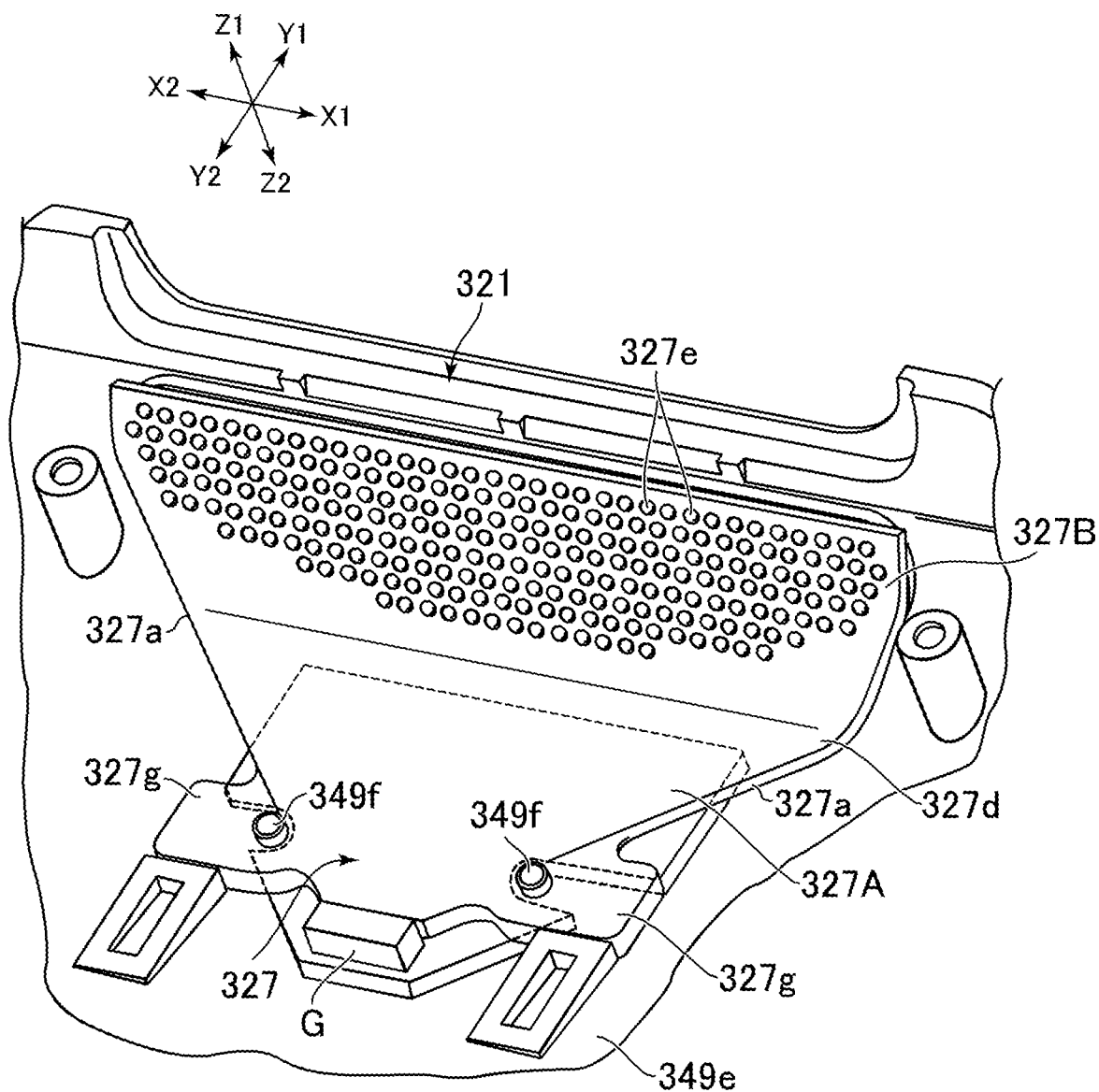
FIG. 27 is a perspective view showing a modification of the operating device according to the embodiment of the present invention.
Figure 28:
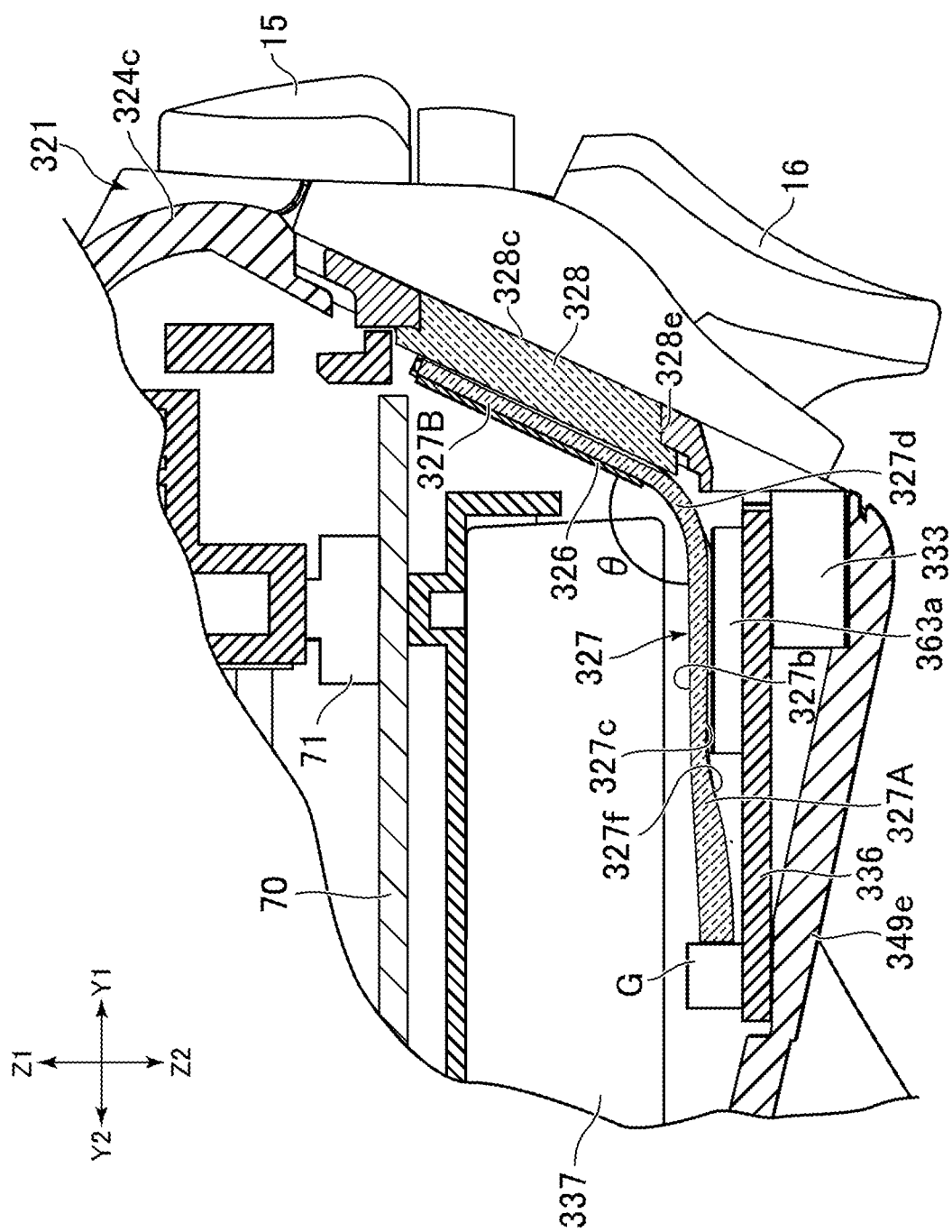
FIG. 28 is a sectional view of the operating device according to the modification shown in FIG. 27.

FIGS. 27 and 28 are diagrams illustrating a modification of the operating device 301 shown in FIGS. 22 to 26. In the example illustrated in these figures, mainly the layout of a light source G differs from that in the example shown in FIGS. 22 to 26. FIG. 27 is a perspective view showing the light source G and a light guide member 327. FIG. 28 is a sectional view, taken in the same manner as FIG. 26.

In the example illustrated in these figures, also, a central section 321 has a light emitting panel 328. The light emitting panel 328 is a light diffusing member for diffusing light in the inside thereof. The light source G is disposed in a position spaced apart rearward from the light emitting panel 328. Specifically, the light source G is disposed in a position spaced apart rearward from the center in the left-right direction of the light emitting panel 328. As aforementioned, the central section 321 has a circuit board 336 spaced apart downward from a circuit board 70 on which a switch 71 is mounted. The light source G in the example described here is mounted on an upper side of the circuit board 336. The light source G is so mounted on the circuit board 336 that the light thereof outgoes forward.

The central section 321 in the example shown here has a light guide plate 327. The light guide plate 327 is so disposed as to extend forward from the light source G, toward a back surface of the light emitting panel 328 (see FIG. 28). As depicted in FIG. 27, the light guide plate 327 has left and right side surfaces 327a which are so inclined that the width of the light guide plate 327 in the left-right direction gradually increases along the forward direction. Such a shape of the light guide plate 327 ensures that light outgoing from the light source G advances forward while being reflected on the left and right side surfaces 327a, an upper surface 327b, and a lower surface 327c of the light guide plate 327, and, in this process, is diverged in the left-right direction. As a result, light emission can be induced in the whole region of the light emitting panel 328, which is elongated in the left-right direction. The light source G is disposed in a position spaced rearward from a portion between left and right end portions of the light emitting panel 328. In the example described here, the light source G is disposed in a position spaced rearward from the center in the left-right direction of the light emitting panel 328. Therefore, the light guide plate 327 is in a left-right symmetry shape. The light source G is located on the rear side of a rear end of the light guide plate 327.

With the distance from the light emitting panel 328 to the light source G enlarged, namely, with the distance from the light emitting panel 328 to the rear end of the light guide plate 327 enlarged, it becomes easier for the light advancing within the light guide plate 327 to be reflected on the side surfaces 327a. Therefore, it is desirable that the distance from the light emitting panel 328 to the light source G be longer. In the example shown in FIG. 28, the light source G is disposed at the rear end of the circuit board 336.

As illustrated in FIG. 28, the circuit board 336 is disposed in a position below the light emitting panel 328. More specifically, the circuit board 336 is arranged in a position below a lower edge 328e of the light emitting panel 328. In addition, in the example described here, the light source G is also disposed in a position below the lower edge 328e of the light emitting panel 328. The light guide plate 327 has a first plate portion 327A extending forward from the light source G. The first plate portion 327A is disposed along the circuit board 336. In other words, the first plate portion 327A is arranged horizontally. In addition, the light guide plate 327 has a second plate portion 327B disposed along a back surface of the light emitting panel 328. The light guide plate 327 has a bent portion 327d formed between the first plate portion 327A and the second plate portion 327B. Light passing from the first plate portion 327A into the second plate portion 327B is reflected on a surface of the bent portion 327d without fail. Therefore, the provision of the bent portion 327d as part of the light guide plate 327 increases the number of times of light reflection. As a result, the light advancing through the light guide plate 327 is more likely to diverge in the left-right direction. As aforementioned, a battery 337 is disposed between the circuit board 336 and the circuit board 70. In the example described here, by virtue of the bend of the light guide plate 327, it is made possible to avoid interference between the light guide plate 327 and the battery 337. A light reflecting member may be attached to a surface (for example, a surface oriented obliquely downward) of the bent portion 327d. Alternatively, a surface of the bent portion 327d may be processed for reflection of light thereon. In other words, a member for total reflection of light, for example, a mirror surface, may be attached to the surface of the bent portion 327d, or a surface processing may be applied to the surface of the bent portion 327d.

The light emitting panel 328 is disposed to be oriented obliquely downward, as aforementioned. As shown in FIG. 28, the second plate portion 327B is disposed along the back surface of the light emitting panel 328, and is inclined in the same manner as the light emitting panel 328. On the other hand, the first plate portion 327A is arranged along the circuit board 336, and is horizontal. In other words, the first plate portion 327A is disposed perpendicularly to the vertical direction. Therefore, an obtuse angle θ is formed between the first plate portion 327A and the second plate portion 327B. This enables the bent portion 327d to be bent gently. As a result, it is possible to restrain the light advancing within the light guide plate 327 from being transmitted through the surface of the bent portion 327d without advancing into the second plate portion 327B.

As shown in FIG. 27, the back surface of the second plate portion 327B (the surface on the side opposite to the light emitting panel 328) has been embossed (in FIG. 27, a plurality of recesses 327e are drawn for clarification of embossing). The embossing ensures that the light impinging on the back surface of the second plate portion 327B is more likely to be reflected forward. As a result, the brightness of the light emitting panel 328 can be increased. The embossing is applied to that region of the back surface of the second plate portion 327B which corresponds to the light emitting panel 328. In addition, in the example described here, as depicted in FIG. 28, a reflective plate 326 is attached to the back surface of the second plate portion 327B. This ensures that the light advancing within the second plate portion 327B is further likely to be reflected forward.

Electronic parts are arranged on an upper surface of the circuit board 336. The first plate portion 327A is disposed on the upper side of the electronic parts. In the example described here, as shown in FIG. 28, a connector 336a for connection with a cable for electrical connection between the circuit board 336 and the circuit board 70 is mounted on the upper surface of the circuit board 336, and the first plate portion 327A is disposed on the upper side of the connector 336a. A lower surface of the first plate portion 327 has an inclined surface 327f for avoiding interference between the first plate portion 327A and the connector 336a. The light source G is disposed spaced apart rearward from the connector 336a. Therefore, gentle inclination of the inclined surface 327f of the first plate portion 327A is achieved. As a result, it is achieved to restrain the light from being transmitted through the inclined surface 327f. In other words, the light is likely to undergo total reflection on the inclined surface 327f.

As illustrated in FIG. 27, the first plate portion 327A is formed at a rear portion thereof with attachment parts 327g which project leftward and rightward. Projections 349f projecting from a bottom portion 349e of the central section 321 are fitted in holes formed in the attachment parts 327g. By this the light guide plate 327 is attached to the bottom portion 349e.

In the example illustrated in FIGS. 27 and 28, the light source G is attached to the circuit board 336. However, the light source G may be attached to the circuit board 70. In this case, a configuration may be adopted wherein the light source G is disposed spaced apart rearward from the light emitting panel 328, and the aforementioned light guide plate 327 is disposed therebetween.

Besides, in the case where the component parts such as the battery 337 are not arranged between the circuit board 336 and the circuit board 70, the light guide plate 327 may not necessarily have the bent portion 327d.

The invention claimed is:

1. An operating device comprising:
   left and right hold sections to be held by a user;
   a first operating member which is disposed at the one of the right or the left hold sections, the first operating member being an operating button; and
   a first operating stick which is disposed at one of a right side or a left side with respect to the center line which extends in a front-rear direction of the operating device;
   a second operating member which has a smaller size than the first operating stick and the first operating member in a plane view, the second operating member being an operating button;
   wherein, in the plane view, a point is located on the second operating member, the point being located at an equal distance from both a center of the first operating stick and a center of the first operating member.

2. The operating device according to claim 1, wherein the second operating member is located at an opposite side of the first operating member with respect to a straight line which extends in the front-rear direction and passes through the center of the first operating stick.

3. The operating device according to claim 2, further comprising:
   a plurality of operating buttons which are disposed at the one of the right or the left hold sections, each of the plurality of operating buttons being disposed at each edge of a cross, wherein the first operating member is one of the plurality of operating buttons, the one of the plurality of operating buttons being located closer to the straight line than any of the other of the plurality of operating buttons.

4. The operating device according to claim 1, wherein a height of the second operating member is smaller than a height of the first operating member.

5. The operating device according to claim 1, further comprising:
   a second operating stick which is disposed at an opposite side of the first operating stick with respect to the center line which extends in the front-rear direction,
   a third operating member which is disposed at an opposite side of the first operating member with respect to the center line, and
   a fourth operating member which is disposed at an opposite side of the second operating member with respect to the center line,
      wherein the second operating member is disposed in symmetry to the fourth operating member with respect to the center line.

6. The operating device according to claim 1 wherein the second operating member functions as a short-cut button which instructs a game machine to transmit game data or a user's comment to a server.

* * * * *